(12) United States Patent
Hellman

(10) Patent No.: US 8,270,901 B2
(45) Date of Patent: Sep. 18, 2012

(54) DROPOUT-RESISTANT MEDIA BROADCASTING SYSTEM

(75) Inventor: Martin E Hellman, Stanford, CA (US)

(73) Assignee: Martin E. Hellman, Stanford, CA (US)

( * ) Notice: Subject to any disclaimer, the term of this patent is extended or adjusted under 35 U.S.C. 154(b) by 1014 days.

(21) Appl. No.: 11/303,605

(22) Filed: Dec. 16, 2005

(65) Prior Publication Data
US 2006/0136967 A1    Jun. 22, 2006

Related U.S. Application Data

(60) Provisional application No. 60/714,539, filed on Dec. 17, 2004, provisional application No. 60/698,786, filed on Jul. 12, 2005.

(51) Int. Cl.
*H04B 7/14* (2006.01)

(52) U.S. Cl. ............. 455/18; 725/62; 725/68; 725/100; 725/131; 725/139; 348/731

(58) Field of Classification Search ...................... 455/18
See application file for complete search history.

(56) References Cited

U.S. PATENT DOCUMENTS

| | | | | |
|---|---|---|---|---|
| 4,083,003 A * | 4/1978 | Haemmig | ...................... | 375/259 |
| 4,135,156 A * | 1/1979 | Sanders et al. | ............... | 455/13.2 |
| 4,217,588 A * | 8/1980 | Freeny, Jr. | ...................... | 342/458 |
| 4,344,171 A | 8/1982 | Lin | | |
| 4,720,873 A | 1/1988 | Goodman et al. | | |
| 4,744,024 A * | 5/1988 | Potash et al. | ................... | 710/109 |
| 5,195,109 A * | 3/1993 | Bochmann et al. | ............ | 375/347 |
| 5,365,569 A * | 11/1994 | Witsaman et al. | ............ | 340/7.26 |
| 5,387,927 A * | 2/1995 | Look et al. | ...................... | 725/114 |
| 5,649,284 A * | 7/1997 | Yoshinobu | ..................... | 725/114 |
| 5,677,918 A * | 10/1997 | Tran et al. | ...................... | 714/748 |
| 5,686,954 A | 11/1997 | Yoshinobu et al. | | |
| 5,768,527 A * | 6/1998 | Zhu et al. | ...................... | 709/231 |
| 5,784,376 A * | 7/1998 | Le Gall | .......................... | 370/460 |
| 5,790,937 A * | 8/1998 | Gutle | .............................. | 725/135 |
| 5,815,671 A | 9/1998 | Morrison | | |
| 5,896,555 A * | 4/1999 | Yoshinobu | ..................... | 725/117 |
| 5,923,896 A * | 7/1999 | Young | ............................... | 710/5 |
| 6,011,509 A * | 1/2000 | Dutka | ...................... | 342/357.29 |
| 6,061,760 A | 5/2000 | Huang | | |
| 6,163,683 A | 12/2000 | Dunn et al. | | |
| 6,167,235 A * | 12/2000 | Sibecas et al. | ............... | 340/7.29 |
| 6,177,960 B1 | 1/2001 | Van Luyt | | |
| 6,192,340 B1 | 2/2001 | Abecassis | | |
| 6,249,532 B1 * | 6/2001 | Yoshikawa et al. | ........... | 370/486 |
| 6,272,190 B1 * | 8/2001 | Campana, Jr. | ................. | 375/347 |
| 6,289,455 B1 | 9/2001 | Kocher et al. | | |
| 6,307,487 B1 | 10/2001 | Luby | | |

(Continued)

OTHER PUBLICATIONS

U.S. Appl. No. 09/695,226, Marko et al.

(Continued)

*Primary Examiner* — Hai Nguyen

(74) *Attorney, Agent, or Firm* — Dov Rosenfeld; Inventek

(57) ABSTRACT

The present invention relates to media broadcast in which memory is used to reduce annoying signal dropouts. A receiver records dropout-free program material and, when a subscriber requests a particular program channel, the radio uses recorded dropout-free program material from the requested channel, only switching to the real-time broadcast, which is subject to dropouts, if the recorded dropout-free program material for the requested channel is exhausted.

32 Claims, 6 Drawing Sheets

U.S. PATENT DOCUMENTS

| | | | |
|---|---|---|---|
| 6,320,520 B1 | 11/2001 | Luby | |
| 6,373,406 B2 | 4/2002 | Luby | |
| 6,411,223 B1 | 6/2002 | Haken et al. | |
| 6,434,622 B1 | 8/2002 | Monteiro et al. | |
| 6,463,585 B1 | 10/2002 | Hendricks | |
| 6,486,803 B1 | 11/2002 | Luby et al. | |
| 6,564,003 B2 * | 5/2003 | Marko et al. | 386/69 |
| 6,574,793 B1 * | 6/2003 | Ngo et al. | 725/32 |
| 6,587,127 B1 | 7/2003 | Leeke et al. | |
| 6,594,794 B1 | 7/2003 | De Marzi et al. | |
| 6,600,908 B1 | 7/2003 | Chan | |
| 6,608,994 B1 * | 8/2003 | Wegener et al. | 455/3.06 |
| 6,609,097 B2 * | 8/2003 | Costello et al. | 704/500 |
| 6,614,366 B2 | 9/2003 | Luby | |
| 6,640,305 B2 | 10/2003 | Kocher et al. | |
| 6,697,608 B2 | 2/2004 | King-Smith | |
| 6,704,556 B1 * | 3/2004 | Eaton et al. | 455/260 |
| 6,725,022 B1 | 4/2004 | Clayton et al. | |
| 6,763,226 B1 * | 7/2004 | McZeal, Jr. | 455/90.2 |
| 6,785,656 B2 | 8/2004 | Patsiokas et al. | |
| 6,834,156 B1 | 12/2004 | Marko et al. | |
| 6,845,230 B2 | 1/2005 | Syed | |
| 6,873,629 B2 * | 3/2005 | Morris | 370/535 |
| 6,876,835 B1 | 4/2005 | Marko et al. | |
| 6,925,285 B2 * | 8/2005 | Kim | 455/3.02 |
| 6,944,142 B2 * | 9/2005 | Grieco | 370/331 |
| 6,961,370 B2 * | 11/2005 | Chappell | 375/224 |
| 7,024,685 B1 * | 4/2006 | Foster et al. | 725/151 |
| 7,026,957 B2 * | 4/2006 | Rubenstein | 340/988 |
| 7,117,075 B1 * | 10/2006 | Larschan et al. | 701/35 |
| 7,180,917 B1 | 2/2007 | Marko et al. | |
| 7,197,234 B1 * | 3/2007 | Chatterton | 386/95 |
| 7,216,358 B1 | 5/2007 | Vantalon et al. | |
| 7,474,621 B2 * | 1/2009 | Mimura et al. | 370/241 |
| 7,486,640 B2 * | 2/2009 | Borsos et al. | 370/331 |
| 7,490,053 B1 | 2/2009 | Emerson et al. | |
| 7,493,289 B2 * | 2/2009 | Verosub et al. | 705/51 |
| 7,505,966 B2 * | 3/2009 | Kato | 1/1 |
| 7,551,889 B2 * | 6/2009 | Quelle | 455/3.06 |
| 7,720,432 B1 | 5/2010 | Colby et al. | |
| 7,721,337 B2 * | 5/2010 | Syed | 726/26 |
| 7,730,508 B2 * | 6/2010 | Haydock | 725/32 |
| 7,778,519 B2 * | 8/2010 | Harville | 386/230 |
| 7,840,178 B2 * | 11/2010 | Hellman | 455/3.02 |
| 7,865,917 B2 * | 1/2011 | Hellman | 725/14 |
| 7,925,141 B2 * | 4/2011 | Geer et al. | 386/341 |
| 7,971,227 B1 * | 6/2011 | Marko et al. | 725/151 |
| 7,975,277 B1 * | 7/2011 | Jerding et al. | 725/25 |
| 7,992,166 B2 * | 8/2011 | Jerding et al. | 725/32 |
| 8,006,262 B2 * | 8/2011 | Rodriguez et al. | 725/37 |
| 8,006,273 B2 * | 8/2011 | Rodriguez | 725/86 |
| 2001/0019310 A1 | 9/2001 | Luby | |
| 2001/0036224 A1 | 11/2001 | Demello et al. | |
| 2002/0073421 A1 * | 6/2002 | Levitan et al. | 725/28 |
| 2002/0087685 A1 | 7/2002 | Lassen et al. | |
| 2002/0107968 A1 | 8/2002 | Horn et al. | |
| 2002/0116277 A1 | 8/2002 | Kraft | |
| 2002/0122598 A1 * | 9/2002 | Ribas-Corbera et al. | 382/239 |
| 2002/0129159 A1 | 9/2002 | Luby et al. | |
| 2002/0129362 A1 * | 9/2002 | Chang et al. | 725/32 |
| 2002/0132575 A1 | 9/2002 | Kesling et al. | |
| 2002/0184038 A1 * | 12/2002 | Costello et al. | 704/500 |
| 2002/0190878 A1 | 12/2002 | Luby | |
| 2003/0014767 A1 | 1/2003 | Stumphauzer | |
| 2003/0058958 A1 | 3/2003 | Shokrollahi et al. | |
| 2003/0081671 A1 * | 5/2003 | Ishida et al. | 375/240 |
| 2003/0122959 A1 * | 7/2003 | Ishida et al. | 348/426.1 |
| 2003/0129941 A1 | 7/2003 | Kawatama et al. | |
| 2003/0192060 A1 * | 10/2003 | Levy | 725/133 |
| 2003/0226089 A1 | 12/2003 | Rasmussen et al. | |
| 2003/0236843 A1 | 12/2003 | Weber et al. | |
| 2004/0003399 A1 | 1/2004 | Cooper | |
| 2004/0021588 A1 | 2/2004 | Luby | |
| 2004/0075593 A1 | 4/2004 | Shokrollahi et al. | |
| 2004/0083487 A1 | 4/2004 | Collens et al. | |
| 2004/0101274 A1 | 5/2004 | Foisy et al. | |
| 2004/0110468 A1 | 6/2004 | Perlman | |
| 2004/0116069 A1 | 6/2004 | Fadavi-Ardekani et al. | |
| 2004/0116070 A1 | 6/2004 | Fishman et al. | |
| 2004/0163135 A1 | 8/2004 | Giaccherini | |
| 2004/0199654 A1 | 10/2004 | Juszkiewicz | |
| 2004/0205028 A1 | 10/2004 | Verosub et al. | |
| 2004/0225519 A1 | 11/2004 | Martin | |
| 2004/0266336 A1 * | 12/2004 | Patsiokas et al. | 455/3.04 |
| 2005/0172329 A1 * | 8/2005 | Kim et al. | 725/129 |
| 2006/0008256 A1 | 1/2006 | Khedouri et al. | |
| 2006/0070095 A1 * | 3/2006 | Newton et al. | 725/27 |
| 2006/0133414 A1 * | 6/2006 | Luoma et al. | 370/466 |
| 2006/0190970 A1 | 8/2006 | Hellman | |
| 2007/0014536 A1 | 1/2007 | Hellman | |
| 2007/0065122 A1 * | 3/2007 | Chatterton | 386/126 |
| 2007/0140318 A1 | 6/2007 | Hellman | |
| 2007/0146812 A1 * | 6/2007 | Lawton | 358/452 |
| 2007/0237329 A1 | 10/2007 | Qawami et al. | |
| 2008/0109284 A1 * | 5/2008 | Slaney et al. | 705/7 |
| 2008/0300983 A1 * | 12/2008 | Chen et al. | 705/14 |
| 2009/0210902 A1 * | 8/2009 | Slaney et al. | 725/34 |

OTHER PUBLICATIONS

U.S. Appl. No. 09/695,228, Marko et al.
U.S. Appl. No. 60/698,786, Hellman.
U.S. Appl. No. 60/714,539, Hellman.
NIST FIPS PUB-197 "Announcing the Advanced Encryption Standard (AES)," Nov. 26, 2001, pp. i-iii and 1-26. Available from NTIS, 5285 Port Royal Road, Springfield, VA 22161 and on-line at http://csrc.nist.gov/publications/fips/fips197/fips-197.pdf.
NIST Special Publication 800-38A "Recommendation for Block Cipher Modes of Operation,"Dec. 2001, pp. i-vii and 1-16. Available from Superintendent of Documents, US Govt Printing Office, Mail: Stop SSOP, Washington, DC 20402-0001.
NIST FIPS PUB 186-2 "Digital Signature Standard (DSS)," Jan. 27, 2000, pp. i-ii, 1-2 and 7-10. Available from NTIS at above address.
NIST FIPS PUB 180-2, "Announcing the Secure Hash Standard," Aug. 1, 2002, pp. i-iii and 3-16. Available from NTIS at above address.
Anthony J. McCauley, "Reliable Broadband Communication Using a Burst Erasure Correcting Code," ACM SIGCOMM Computer Communication Review, vol. 20, No. 4, Sep. 1990, pp. 297-306.
U.S. Appl. No. 11/305,097, filed Dec. 16, 2005.
U.S. Appl. No. 11/305,379, filed Dec. 16, 2005
U.S. Appl. No. 11/484,269, filed Jul. 11, 2006.
U.S. Appl. No. 12/818,010, filed Jun. 17, 2010.

* cited by examiner

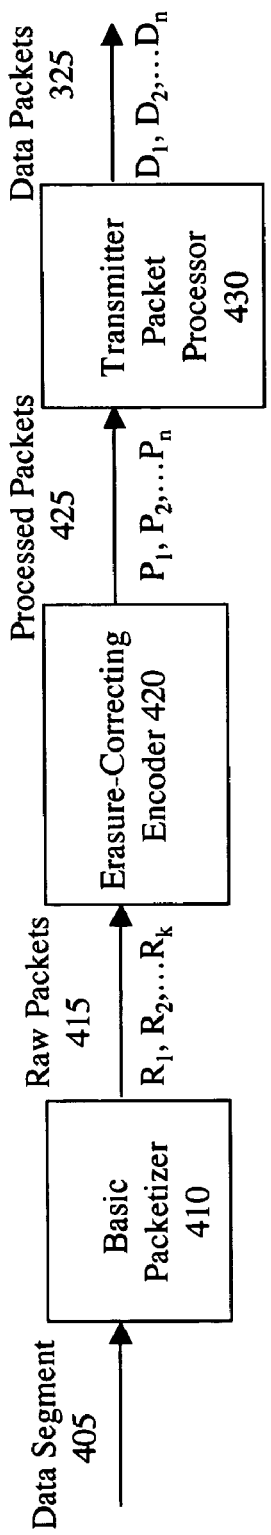

$P_1 = R_1 = s_{1,1} \quad s_{1,2} \quad s_{1,3} \quad \cdots \quad s_{1,4999} \quad s_{1,5000}$
$P_2 = R_2 = s_{2,1} \quad s_{2,2} \quad s_{2,3} \quad \cdots \quad s_{2,4999} \quad s_{2,5000}$
$P_3 = R_3 = s_{3,1} \quad s_{3,2} \quad s_{3,3} \quad \cdots \quad s_{3,4999} \quad s_{3,5000}$ $\vdots$ $P_{288} = R_{288} = s_{288,1} \quad s_{288,2} \quad s_{288,3} \quad \cdots \quad s_{288,4999} \quad s_{288,5000}$
$P_{289} = \phantom{R_{289} =} s_{289,1} \quad s_{289,2} \quad s_{289,3} \quad \cdots \quad s_{289,4999} \quad s_{289,5000}$
$P_{290} = \phantom{R_{290} =} s_{290,1} \quad s_{290,2} \quad s_{290,3} \quad \cdots \quad s_{290,4999} \quad s_{290,5000}$ $\vdots$ $P_{65534} = \phantom{R =} s_{65534,1} \quad s_{65534,2} \quad s_{65534,3} \quad \cdots \quad s_{65534,4999} \quad s_{65534,5000}$
$P_{65535} = \phantom{R =} s_{65535,1} \quad s_{65535,2} \quad s_{65535,3} \quad \cdots \quad s_{65535,4999} \quad s_{65535,5000}$

DROPOUT-RESISTANT MEDIA BROADCASTING SYSTEM

CROSS-REFERENCE TO RELATED APPLICATIONS AND DISCLOSURE DOCUMENT

This Patent Application claims the benefit of US Provisional Patent Application Ser. No. 60/714,539 first filed as application Ser. No. 11/015,634 on Dec. 17, 2004, titled "Broadcast System with Differentiated Receivers" and converted to said Provisional Patent Application 60/714,539, the contents of which are incorporated by reference herein. This Patent Application is related to U.S. Patent Disclosure Document Ser. No. 572293 titled "Preloaded Media Distribution System" filed Mar. 8, 2005, the contents of which are incorporated by reference herein. This Patent Application also claims the benefit of U.S. Provisional Patent Application Ser. No. 60/698786 "Storage-Based Media Broadcasting and Distribution System" filed Jul. 12, 2005, the contents of which are incorporated by reference herein. Related subject matter is disclosed and claimed in co-pending U.S. patent applications Ser. No. 11/305,379 titled "Tiered Subscription Broadcast System" and Ser. No. 11/305,097 titled "Security Enhanced Tiered Subscription Broadcast System" both to inventor Martin E. Hellman, both filed 16 December 2005, and the contents of both of which are incorporated by reference herein.

FIELD OF THE INVENTION

The present invention relates to media broadcast in which memory is used to reduce annoying signal dropouts.

BACKGROUND OF THE INVENTION

Both terrestrial radio broadcasters (primarily AM and FM stations) and satellite radio broadcasters (Sirius Satellite Radio and XM Satellite Radio) suffer from annoying signal dropouts. Satellite radio uses coding to allow a signal dropout of approximately four seconds without any loss of audio output, for example when a car radio passes under an overpass at high speed and cannot see the satellite for less than four seconds. But even with this coding, longer signal dropouts produce annoying silences until the signal is regained. In some areas, such as highly mountainous terrain, signal dropouts make satellite radio unusable. The present invention uses memory to greatly reduce the annoyance of signal dropouts.

The use of memory at a receiver is well known in the art. DirectTV, for example, offers a TiVo equipped satellite television receiver, which can store programs on a hard drive and play them back at a later time. In U.S. Pat. No. 6,785,656 "Method and apparatus for digital audio playback using local stored content" Patsiokas et al describe a similar system for use with satellite radio. Since TiVo and its competitors are called PVR's (Personal Video Recorders), Patsiokas' invention might be called a PAR (Personal Audio Recorder).

In U.S. Pat. No. 6,564,003 Marko et al describe another use of memory with satellite radio. Marko demodulates the bit stream from a broadcaster, such as XM Satellite Radio, and records it on a memory medium (e.g., a recordable CD) for later playback at a location that either cannot receive the satellite signal or does not need real time reception. As in Patsiokas, the selection of the recorded program to be played back is subscriber controlled.

In US Patent Application 2004/0266336 "System and method for providing recording and playback of digital media content" Patsiokas et al describe a system for recording and time-shifting a broadcast so that the subscriber does not experience signal dropouts when a real-time signal is not available. Sirius has announced a product, its S50 radio, which stores up to 50 hours of one or more Sirius Radio channels. In US Patent Application 2003/0129941 Kawamata et al buffer past signals to allow switch over to stored content when the signal is lost. The substituted content can be based on subscriber preferences.

The use of memory in satellite radio receivers is also dealt with by Marko et al in U.S. Pat. No. 6,834,156 "Method and apparatus for controlling user access and decryption of locally stored content at receivers in a digital broadcast system," U.S. patent application Ser. No. 09/695,226 for "Method and Apparatus for Employing Stored Content at Receivers to Improve Efficiency of Broadcast System Bandwidth Use," in U.S. patent application Ser. No. 09/695,228 for "Method and Apparatus for Implementing File Transfers to Receivers in a Digital Broadcast System," and in U.S. Pat. No. 6,834,835 for "Method and Apparatus for Providing On-Demand Access of Stored Content at a Receiver in a Digital Broadcast System."

In US Patent Application 2004/0225519 Martin describes storing a library of multimedia works on a storage device and playing a selection based on subscriber preferences.

In U.S. Pat. No. 6,697,608 "Digital audio/visual receiver with recordable memory" King-Smith describes a broadcast receiver with memory to give the subscriber a wider selection of content.

In US Patent Application 2004/0083487 Collens et al describe a media distribution system which delivers content to a subscriber in encrypted form and then delivers keys to unlock the content on a specific playback device.

In U.S. Pat. No. 6,289,455 "Method and apparatus for preventing piracy of digital content" Kocher et al describe a secure CryptoFirewall which protects critical portions of memory so that cryptographic keys used by a cryptoprocessor are inaccessible to all other parts of the system. These keys are made inaccessible to avoid the danger of a pirate attempting to learn them, creating a CryptoFirewall in Kocher's terminology. This architecture prevents the frequent error in the implementation of cryptograpic systems of storing keys in normal read-write memory where the keys are potentially accessible to piracy. The thinking behind this frequent error is that keys need to be written when entered and read when used for encryption or decryption. While this is true, allowing keys to be read by parts of the system which have no need for them other than for piracy, is extremely dangerous. Kocher, however, is not concerned with signal dropouts.

In contrast to the prior art, the present invention:
  automatically determines when to record content, which content to record, when to access stored content, and which stored content is accessed, with little or no subscriber input;
  automatically checks each content segment to ensure it is dropout-free, keeps only dropout-free content segments in memory (or marks recorded content with dropouts for use only in unusual circumstances), and thereby ensures that playback of recorded content is dropout-free (or as dropout-free as possible);
  automatically determines when recorded content is appropriate (e.g., when the program material is recorded music) and, if so, uses dropout-free recorded content segments in preference to real-time broadcast segments, buffering real-time broadcast segments to ensure they are dropout-free before presenting them to the subscriber.

automatically determines when recorded content is not appropriate (e.g., when the program requested is a real-time sporting event), and if so, and uses real-time broadcast segments.

SUMMARY OF THE INVENTION

While the invention is illustrated using specific technologies and examples, all such technologies and examples are intended solely for clarity of illustration, and not by way of limitation. Similar technologies and examples known in the art or developed in the future can be substituted without departing from the spirit of the invention. Unless otherwise stated, all descriptions below are of the preferred embodiment. For clarity of exposition, that limitation will not be repeated each time it applies and is tacit.

Similarly, whenever an embodiment is said to use any method or device known to accomplish a goal, that includes both methods known currently or developed in the future. Again for clarity of exposition, the inclusion of methods developed in the future is tacit.

According to the present invention, a broadcaster can offer subscribers an almost dropout-free listening experience. Pre-existing receivers, which were built without thought to this enhancement, will continue to work normally, but naturally without the enhancement.

While the present invention lends itself to any size and kind of memory, the preferred embodiment uses a 1 GB (gigabyte=1E9 bytes) flash memory. It should be understood, however, that with minor modifications that would be obvious to one skilled in the art, the present invention applies to larger and smaller memories of any type. Similarly, while the present invention works with any form of media, the preferred embodiment is for audio broadcast via satellite radio. A 1 GB flash memory has a current retail cost of approximately $50 and whose cost is falling by a factor of two every year or two. While affordable even today, within five years, the cost is likely to be in the $5-$10 range and be even less of an issue. At a data rate of 50 kbps, 1 GB can store 44 hours of audio programming.

In a simple embodiment, the receiver has a single tuner capable of tuning to only one channel at a time. Content updates of the receiver's memory are performed with program material from channels preferred by the subscriber during times that the receiver is in the OFF state and adequate power is available (e.g., when connected to a wall outlet in a stationary environment, or when the car is running in an automotive environment). As described in detail later:

The list of channels preferred by the subscriber is determined based on listening behavior.

The program content segments to be stored in memory are checked to make sure they are dropout-free (sometimes also called error-free) before being stored.

Only complete, dropout-free content segments are stored in memory, along with a header specifying the channel from which they were recorded.

When a subscriber requests a channel change the receiver checks to see if it has any content segments from that channel stored in memory. If so, the receiver plays the oldest usable content segment from that channel, starting at its beginning and tunes to that channel to place new content segments in memory. If not, the receiver outputs the real-time (sometimes called live) broadcast for that channel, as in pre-existing receivers, in which case dropouts may be heard.

Content segments are deleted from memory after they have been heard, so that they will not be repeated more often than on a real-time broadcast.

When the receiver is in the OFF state but still receiving data, new content segments are added to memory along with an identifier indicating the channel from which they were recorded. If memory is full, the new content pushes out the oldest unheard content segments (from any channel, not just the channel it was recorded from) on a FIFO basis.

Certain content segments, such as commercials, are specially marked so that they cannot be skipped and must be heard in their entirety.

The preferred embodiment is slightly more complex and utilizes a tuner capable of tuning to three channels simultaneously. The receiver can then tune to two other channels even when the subscriber is listening to a channel on the receiver, and perform content updates of the receiver's memory with new program material from those two other channels in addition to the channel being heard by the subscriber. As in the simple embodiment, these two other channels are chosen from a list of channels preferred by the subscriber and when a channel change is requested, the receiver first looks for usable, stored, dropout-free content for that channel and only switches to the real-time broadcast if no usable, stored, dropout-free content for that channel is available. When the receiver is in the OFF state and adequate power is available, three channels can be updated in memory.

The beginning and end of content segments (songs with introductions, comedy pieces, etc.) are communicated to the receiver by the broadcaster in a manner which does not interfere with operation of pre-existing receivers which do not embody the present invention. No additional steps are required to accomplish this if the broadcast system is such that current receivers already are told the start and stop times of content segments. (This appears to be the case with Sirius and XM as evidenced by the title and artist appearing on a visual display when a program segment starts and disappearing when it ends.) Otherwise, the start and stop times are communicated over the command channel as a sequence of receiver commands that pre-existing receivers are programmed to ignore.

Some programs, such as real-time sporting events, do not lend themselves to delayed playback and receivers are normally instructed to bypass stored content when such programs are broadcast on a channel requested by a subscriber. Alternatively a threshhold (e.g., 60 seconds) can be set for allowing recorded program content from such broadcasts. Also preferably, when a subscriber tunes to such a channel and a real-time event is in progress, the subscriber is given a choice of the real-time event or recorded program material. While it will not be discussed further in this application, clearly prior art can be included to allow subscribers to save and access recorded program material in "personal audio recorder" mode. For example, some subscribers will wish to save a particularly interesting sporting event and listen to it several times.

Similarly news programs that are older than a threshhold (e.g., 60 minutes) set by the broadcaster or subscriber will be played in real-time even though dropouts can then occur. Music programs are well suited to the present invention since most subscribers cannot tell whether they are hearing a real-time broadcast or content that was previously recorded, stored in memory, and is now being replayed.

Even real-time program segments may be stored in a memory temporarily, for a short period of time (milliseconds or seconds), to allow buffering, error-correction and detection, etc. While such program segments are slightly delayed, herein they are regarded as real-time program segments.

Multiplexing

Multiplexing techniques known in the art are used in the present invention to share the data rate of the channel to deliver any additional data required (e.g., content segment start and stop times, if the pre-existing system did not convey them) while still delivering normal program content. Multiplexing techniques include, for example, time-division multiple access (TDMA), frequency-division multiple access (FDMA), code-division multiple access (CDMA, also known as spread spectrum modulation), and the use of packet-based protocols such as the TCP/IP (Transmission Control Protocol/Internet Protocol).

Sirius and XM already use multiplexing to send approximately 100 channels of program entertainment over the spectrum licensed to them by the FCC. XM also uses multiplexing to send real-time weather information to aircraft and other users who have paid for this service. Sirius has promised to add video services and will use multiplexing techniques to send this new content.

Sirius and XM each have approximately 10 Mbps (megabits per second) of digital transmission bandwidth available to them. Using 10 Mbps for illustrative purposes, this data rate can be used to provide 100 program channels at 100 kbps each, but both services make use of the fact that talk channels sound acceptable at lower data rates than music channels and allocate less bandwidth per talk channel. Because classical music and its listeners are even more demanding than other music offerings, classical music channels are often allocated a higher data rate than rock and roll.

Sirius even dynamically allocates its data rate, using different data rates at different times on each channel. For example, a classical music channel which has been allocated a larger than normal data rate can be backed off to a lower data rate when the announcer is telling listeners the details of the next piece to be played. Conversely, a talk channel can be allocated extra data rate when a short piece of music is being played, for example as part of a commercial.

Encryption Operations

The preferred embodiment uses NIST's Advanced Encryption Standard (AES) for all required conventional (symmetric) encryption operations. AES is specified in FIPS PUB 197 available on-line at the time of filing this application at the URL csrc~dot~nist~dot~gov/publications/fips/fips197/fips-197~dot~pdf, where ~dot~ denoted the period (".") in the actual URL, and in hard copy form from the Government Printing Office. AES allows 128, 192 and 256-bit keys. AES has a 128-bit block size, meaning that plaintext (unencrypted data) is operated on in 128-bit portions to produce 128-bit ciphertext portions, and vice versa.

If a plaintext, other than a key which is to be encrypted, is longer than 128 bits, the plaintext is broken into 128-bit blocks and encrypted using AES in cipher block chaining (CBC) mode as defined in NIST Special Publication 800-38A "Recommendation for Block Cipher Modes of Operation." For example, a content segment (CS) consisting of three minutes of audio encoded at 128 kbps is 23,040,000 bits long and will be broken into 180,000 plaintext content segment blocks, each 128 bits long, denoted $CS_1, CS_2, \ldots CS_{180000}$ which are encrypted into encrypted content segments (ECS's) consisting of 180,000 128-bit blocks $ECS_1, ECS_2, \ldots ECS_{180,000}$ via the relation $$ECS_i = E_{KOM}(CS_i + ECS_{i-1}) \text{ for } i=1, 2, \ldots, 180000$$

where $E_K(P)$ denotes AES encryption of the 128-bit quantity P under key K, + denotes the XOR operation (bit-by-bit addition mod-2), KOM is a 128-bit Key Of the Month used to encrypt content segments within a given set (e.g., intended for a given tier of subscribers), and $ECS_0$ is an initialization vector as defined in NIST Special Publication 800-38A "Recommendation for Block Cipher Modes of Operation." The inverse, decrypting operation is $$CS_i = D_{KOM}(ECS_i) + ECS_{i-1} \text{ for } i=1, 2, \ldots, 180000$$

where $D_K(C)$ denotes AES decryption of the 128-bit quantity C under key K.

While not used in the preferred embodiment, any keys longer than 128 bits are encrypted using AES's Counter Mode, as described in NIST Special Publication 800-38A "Recommendation for Block Cipher Modes of Operation." Counter mode has the advantage that the resultant ciphertext is the same length as the plaintext, even if the plaintext is not a multiple of the 128-bit AES block size. In contrast, CBC mode pads out any partial plaintext blocks since CBC must act on multiples of the block size.

Keys, such as keys of the month, which are 128 bits in length are encrypted using AES's Electronic Code Book (ECB) Mode, as described in NIST Special Publication 800-38A "Recommendation for Block Cipher Modes of Operation."

User authorization messages are sent monthly to each subscriber's receiver indicating the tier of service to which that user's receiver is entitled (if there is more than one) and providing one or more keys of the month to give that receiver access to all encrypted content segments included on that tier of service's programs for that month. A user authorization message consists of the following fields:

a 48-bit field specifying the serial number of the user's receiver;
a 32-bit field specifying the current date and time;
a 4-bit field specifying the month for which the authorization is valid;
a 4-bit field specifying the tier of service to which the user is entitled;
a 128-bit field specifying the key of the month for the authorized tier of service; and
a 160-bit field providing a digital signature, produced by the broadcaster, proving that the user authorization message is legitimate.

In the preferred embodiment, each receiver is manufactured with a unique serial number (accessible to its microprocessor) and a 256-bit cryptographic key (hereafter its device key) so that messages can be addressed to a particular receiver and, when appropriate, be encrypted in a manner that only that receiver can decrypt. (In alternative embodiments serial numbers and/or cryptographic keys may be shared by more than one unit, for example when all billed to the same account. In another alternative embodiment, each receiver has mulitple device keys.) Since $2^{48}$ is approximately 280 trillion, a 48-bit serial number allows as many receivers as desired to be manufactured without running out of serial numbers.

The current date and time, accurate to one second in 100 years, can be specified by a 32-bit number. The month for which the authorization is valid can be specified by a 4-bit number, allowing authorizations up to 16 months beyond the month of the current date and time. Time can either be absolute or relative.

Under the reasonable assumption that there are no more than 16 tiers of service, another 4-bit number can specify the tier of service to which the user is entitled. (This field is deleted if there is only one tier of service.)

A key of the month for the authorized tier of service is a 128-bit quantity and is sent to each receiver encrypted in Electronic Code Book Mode by AES in that receiver's 256-bit device key so that the key of the month cannot be used by receivers other than the one for which the user authorization message was intended. In the preferred embodiment, higher tier subscribers who receiver fewer or no commercials are sent more than one key of the month because program content segments which are replaced by additional information content segments (e.g., commercials) are encrypted in a different key of the month from program content segments that are accessible to lower tiers of subscribers. In embodiments with N tiers of service, this gives rise to the need for N keys of the month, with the lowest tier of subscribers getting only one (lowest value) key of the month, and highest tier subscribers getting all N keys of the month. (In an alternative embodiment, the lowest tier subscribers do not need a key of the month and program content segments accessible to the lowest tier are not encrypted.) The use of multiple keys of the month for higher tier subscribers allows higher tier subscribers to access more program content segments than lower tier subscribers. It also prevents lower tier subscribers from gaining access to unauthorized content even if they hack their receivers and override receiver commands which substitute commercials for some program content.

The 160-bit digital signature is used to prevent opponents from injecting spurious messages which might cause receivers to use an incorrect key of the month, thereby sabotaging the broadcasting service in a form of denial of service attack. (The digital signature is not needed to prevent receivers from accessing tiers of service to which they are not legitimately entitled because the keys of the month for those tiers of service will not be known to an unauthorized receiver). Digital signatures are known in the art and are described for example in NIST's FIPSPUB 186-2 "Digital Signature Standard (DSS)", available on-line at NIST's web site or through the Government Printing Office. FIPSPUB 186-2 requires the use of the Secure Hash Algorithm (SHA) described in NIST's FIPSPUB 180-1, "Secure Hash Standard", also available on-line at NIST's web site or through the Government Printing Office. The variant of SHA described in FIPSPUB 180-1 is called SHA-1 since it is slightly different from, and more secure than, the original FIPSPUB 180's SHA without the -1 suffix. While the DSS allows variants, the preferred embodiment uses 160-bit signatures as specified therein. The preferred embodiment uses public key cryptography's digital signatures instead of conventional cryptography's message authentication codes (MAC's) to avoid placing the broadcaster's secret key in any receiver. This way, even if an opponent takes apart a receiver and learns the broadcaster's public key used to authenticate the digital signature, the opponent is unable to generate new digital signatures from it. Alternative embodiments can use other digital signatures (e.g., RSA) or MAC's.

Reasons for Different Key Lengths

As noted above, device keys are 256 bits long and keys of the month are 128 bits long. There are two reasons for these different key lengths. First, the value of the information protected by each class of key is different and the use of longer keys to protect more valuable data is standard practice. In order of their economic value the keys are:

256-bit device keys protect keys of the month,
128-bit keys of the month protect content segments.

Second, as will be described in detail later, the present invention is designed to make sure that the two classes of protected data (keys of the month and content segments) are directed only to those portions of the receiver where they are intended to go. Using different key sizes prevents an opponent who is able to hijack less secure portions of the receiver (e.g., its microprocessor) from issuing commands which might allow him to see a class of protected data in a portion of the receiver where it is not intended. For example, if the key size were the same for both classes of protected data, the opponent might be able to trick the cryptoprocessor into decrypting a key of the month as if it were a content segment and thereby have it appear in the less secure portion of the receiver where decrypted content segments reside. In that way, he might then be able to learn the key of the month for dissemination to a large group of pirate users not authorized to have access to that tier of service.

BRIEF DESCRIPTION OF THE DRAWINGS

The foregoing and other objects of the invention will be more clearly understood from reading the following description of the invention in conjunction with the accompanying drawings in which:

FIG. 4 is a block diagram of an exemplary embodiment of a transmitter communication protocol;

FIG. 5 depicts the structure of an exemplary embodiment of an erasure-correcting code;

Figure 1:
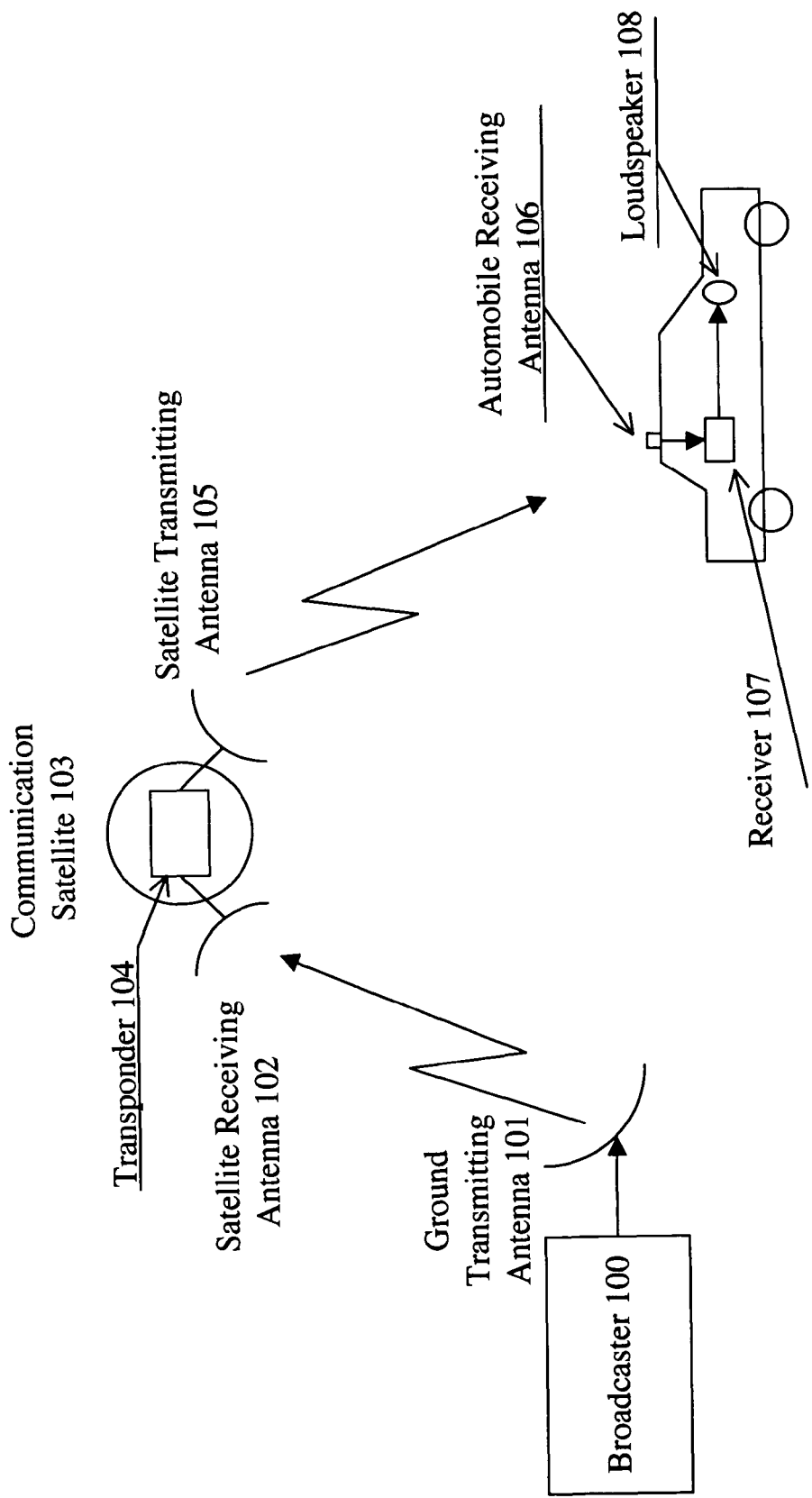
FIG. 1 is a schematic diagram illustrating a broadcast satellite radio system.

Disclosed herein is:

1) A broadcast system comprising: a transmitter which transmits a plurality of program channels; and a plurality of receivers, a portion of which comprise: a tuner-demodulator; a memory; a receiver controller; and output means In the broadcast system: the tuner-demodulator produces program segments from one or more of the program channels; the receiver controller stores at least a portion of the program segments in the memory; the receiver controller stores channel content information in the memory indicative of the program channels associated with the portion of the program segments stored in the memory. In the broadcast system: the user interface specifies a program channel; the receiver controller creates an output signal related to program segments associated with the specified program channel; and the receiver controller performs a program channel content check which depends at least in part on the channel content information. In the broadcast system: if the program channel content check produces an acceptable result: the receiver controller includes in the output signal at least a portion of the program segments stored in the memory which are associated with the specified program channel in preference to other program segments associated with the specified program.

Also disclosed herein is

2) A broadcast system as described in 1 above, in which: the receiver controller also performs a quality check on at least a portion of the program segments; the channel content information is also indicative of the results of the quality check, and in which the program channel content check includes validating that a program segment is complete and error-free to a high degree of certainty.

Also disclosed herein is

3) A broadcast system as described in 2 above in which the high degree of certainty is at least 99.99%.

Also disclosed herein is

4) A broadcast system as described in 1 above, in which the other program segments associated with the specified program are essentially real-time program segments.

Also disclosed herein is

5) A broadcast system as described in 4 above, in which the essentially real-time program segments were produced by the tuner-demodulator within the last 60 seconds.

Also disclosed herein is

6) A broadcast system as described in 4 above, in which the essentially real-time program segments were produced by the tuner-demodulator within the last 60 minutes.

Also disclosed herein is

7) A broadcast system as described in 1 above, in which the program channel content check determines if at least one of the program segments stored in the memory is associated with the specified program channel.

Also disclosed herein is

8) A broadcast system as described in 1 above, in which: the channel content information is at least partly dependent on one or more receiver commands; at least a portion of the receiver commands identify some of the program segments as real-time program segments and others of the program segments as non-real-time program segments; and receiver controller prefers the program segments stored in the memory which are associated with the specified program channel only if the program channel content check indicates that the program segments stored in the memory which are associated with the specified program channel are non-real-time program segments.

Also disclosed herein is

9) A receiver in a broadcast system which comprises a transmitter which transmits a signal including a plurality of program channels, and receiver commands. The receiver comprises: a tuner-demodulator, a memory, a receiver controller; a user interface including a plurality of functions; and output means. In the receiver: the tuner-demodulator produces program segments from one or more of the program channels; the receiver controller creates an output signal at the output means; the receiver controller stores at least a portion of the program segments in the memory; the receiver controller stores channel content information in the memory indicative of the program channels associated with the portion of the program segments stored in the memory; and the receiver controller stores skip content information in the memory. The skip content information is: derived from a portion of the receiver commands, is indicative of the nature of at least one program segment stored in the memory; and is capable of causing the receiver controller to inhibit one or more of the plurality of functions of the user interface when the at least one program segment stored in the memory is included in the output signal. In the receiver: the user interface specifies a program channel; the output signal is related to program segments associated with the specified program channel; the receiver controller performs a program channel content check which depends at least in part on the channel content information. In the receiver, if the program channel content check produces an acceptable result: the receiver controller includes in the output signal at least a portion of the program segments stored in the memory which are associated with the specified program channel in preference to other program segments associated with the specified program.

Also disclosed herein is

10) The receiver of 9 above in which the inhibited function(s) include either a fast forward command, or a skip command or both.

Also disclosed herein is

11) The receiver of 9 above in which the inhibited function(s) apply to program segments that are commercials.

DETAILED DESCRIPTION OF THE DRAWINGS

Having generally described the present invention, a further understanding can be obtained by reference to the specific preferred embodiments, which are provided herein for purposes of illustration only and are not intended to limit the scope of the appended claims.

FIG. 1 illustrates a broadcast satellite radio service in which broadcaster 100 sends a signal to ground transmitting antenna 101. The signal sent from ground transmitting antenna 101 is received by satellite receiving antenna 102 located on communication satellite 103. The signal received by satellite receiving antenna 102 is processed (e.g., frequency translated and amplified) in transponder 104 located within communication satellite 103. The output of transponder 104 is fed to satellite transmitting antenna 105 for broadcast to subscribers.

While a typical system will have thousands or millions of subscribers, both stationary and mobile, for illustrative purposes FIG. 1 shows one mobile subscriber in an automobile with roof mounted automobile receiving antenna 106. The signal received by automobile receiving antenna 106 is input to receiver 107 to produce an audio frequency signal that is output by loudspeaker 108.

While FIG. 1 shows a typical realization, clearly, other possibilities, known in the art are possible within the spirit of the present invention. For example, loudspeaker 108 could be replaced by a headset, or a terrestrial repeater could be transmitting the signal received by automobile receiving antenna 106. The receiving antenna 106, receiver 107, and loudspeaker 108 can be located in a home, office, or other location.

For the sake of clarity, while these and other modifications to the figures are possible and will be obvious to one skilled in the art, the remainder of this description will deal solely with the system shown in FIG. 1, it being understood that such modifications are included in the scope of the present invention. Similarly, for sake of clarity, aspects of the system not germane to the present invention and well understood in the art, are not shown.

Figure 2:
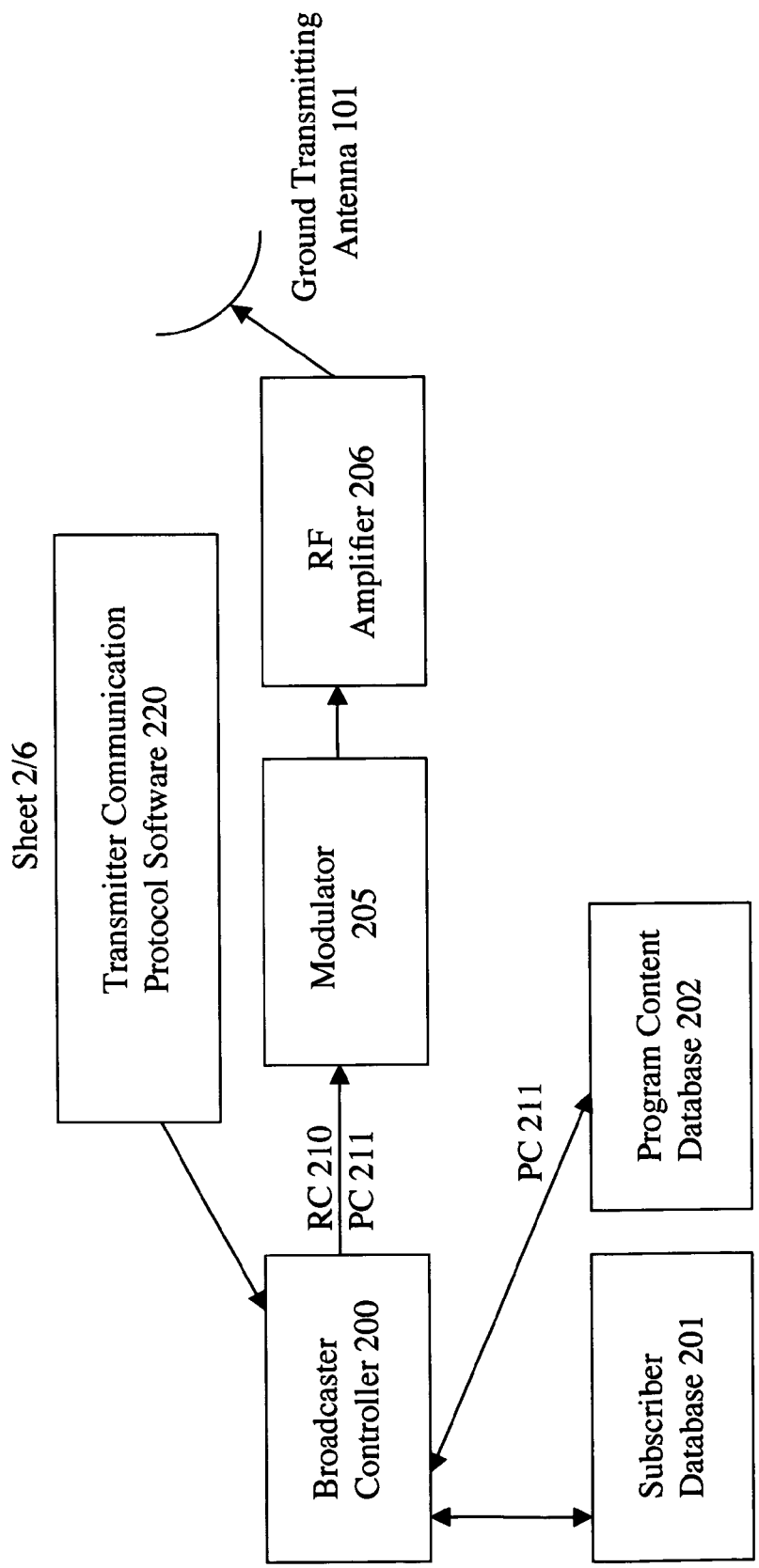
FIG. 2 is a block diagram of an exemplary embodiment of a radio transmitter.

FIG. 2 is a block diagram providing a more detailed view of broadcaster 100 of FIG. 1. Broadcaster controller 200 accesses and updates information, preferably in digital form, in multiple databases. While the number and type of databases can vary, for purposes of illustration, FIG. 2 shows a subscriber database 201, and a program content database 202.

Subscriber database 201 contains a listing of unique identifying numbers (e.g., serial numbers) built into each receiver 107; the tier of service authorized for each receiver 107 (e.g., with or without commercials, if such tiered service is in use); demographic information for the user(s) of each receiver 107 (e.g., zip code); and a list of device keys stored in each receiver 107, used to encrypt certain information communicated from broadcaster 100 to receiver 107. The device keys can be for a conventional (symmetric) cryptosystem such as the Data Encryption Standard (DES) or the newer Advanced Encryption Standard (AES), or for a public key system such as RSA or the Digital Signature Standard (DSS). The preferred embodiment uses an AES device key. Also in the preferred embodiment, the device key stored in a particular receiver 107 will be different from the device keys stored in all other receivers 107.

Program content database 202 contains program content 211, abbreviated PC 211 in FIG. 2, consisting in the preferred embodiment of music, talk shows, DJ introductions, commercials, station announcements, etc. which form the program content of the approximately one hundred channels offered by broadcaster 100. (Alternative embodiments can have as few as one channel or more than one hundred.) Program content 211 is divided into program content segments, each identified by a unique 32-bit program content segment number header.

Receiver commands 210 (abbreviated RC 210 in FIG. 2) are generated by broadcast controller 200 and communicated over the satellite radio channel's command channel. If pre-existing receivers cannot make use of new receiver commands 210 required for the present invention, the pre-existing receivers are programmed to ignore those receiver commands 210. As described in more detail later, receiver commands 210 convey encryption keys needed by receivers. In a broadcast system with multiple tiers of subscriber privileges, receiver commands 210 also specify the tier of service to which a subscriber's receiver 107 is entitled. Receiver commands 210 are communicated using transmitter communication protocol software 220 described in detail later. If pre-existing receivers can support that protocol, program content segments also are communicated using transmitter communication protocol software 220.

Broadcaster controller 200 uses multiplexing techniques known in the art (e.g., see Patsiokas U.S. Pat. No. 6,785,656) to combine receiver commands 210 and program content 211 into a digital bit stream which is presented to modulator 205 so that the digital bit stream can be modulated onto an RF carrier signal. This modulated signal is then amplified by RF amplifier 206 and transmitted to communication satellite 103 via ground transmitting antenna 101.

Figure 3:
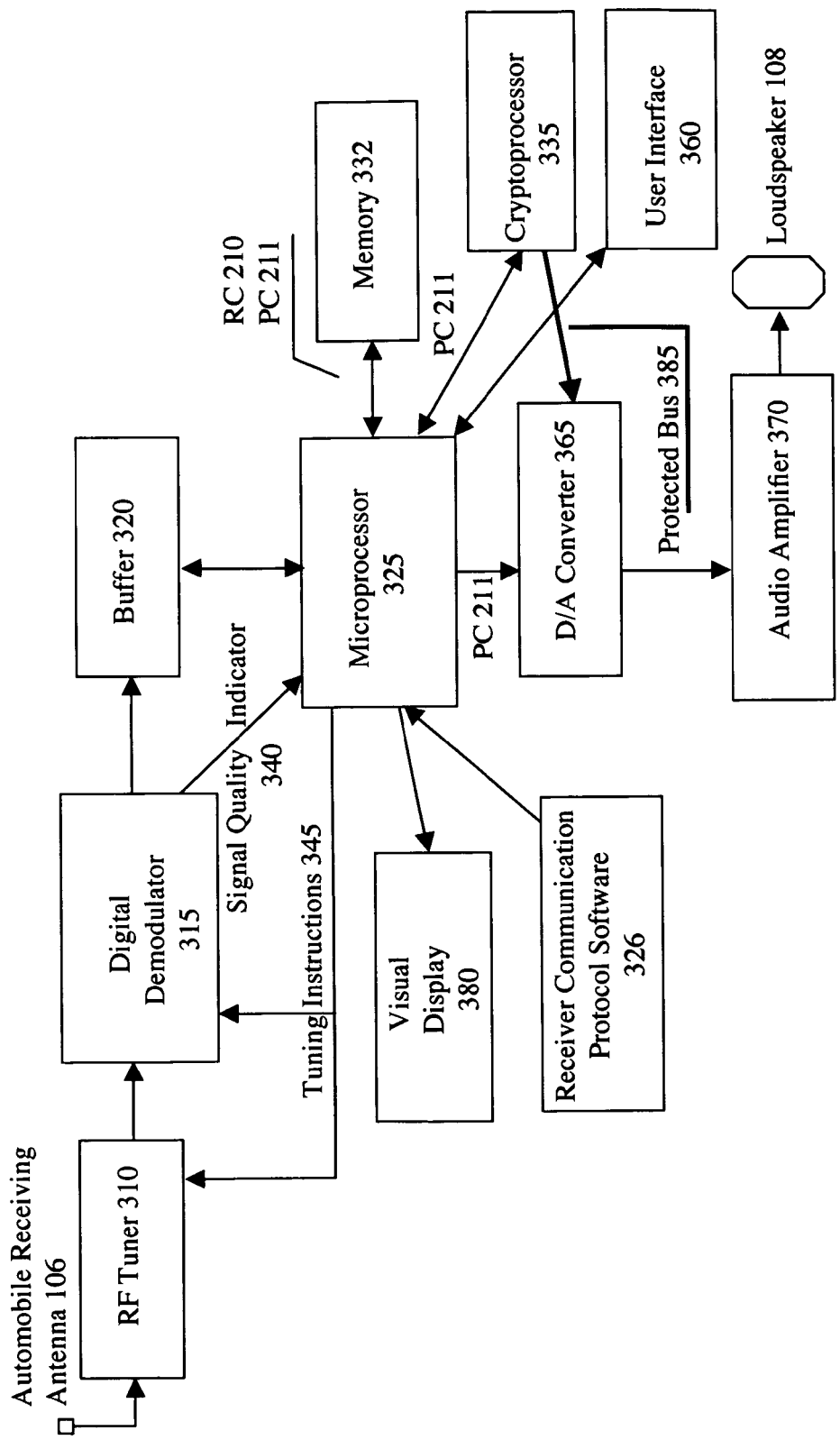
FIG. 3 is a block diagram of an exemplary embodiment of a receiver.

FIG. 3 is a block diagram providing a more detailed view of receiver 107 of FIG. 1. Automobile receiving antenna 106 is connected to RF tuner 310 so that an appropriate signal strength is presented to digital demodulator 315. Filtering, to minimize the effects of out-of-band signals also takes place in RF tuner 310 and/or digital demodulator 315. Digital demodulator 315 outputs a digital bit stream to buffer 320. Digital demodulator also outputs a signal quality indicator 340 to microprocessor 325, for example the signal-to-noise ratio, so that microprocessor 325 knows when good and bad data are likely to be received. In alternative embodiments signal quality indicator 340 can be created by RF tuner 310 or microprocessor 325. For example, as described later, microprocessor 325 uses an error-correcting and detecting code on each received packet. Also described later, if this code indicates an uncorrectable error, microprocessor 325 has an extremely strong indication that signal quality was poor.

Using techniques known in the art (e.g., see Patsiokas U.S. Pat. No. 6,785,656), packet header or similar information allows microprocessor 325 to demultiplex the digital bit stream into separate substreams representing program content 211 and receiver commands 210. Receiver commands 210 (see FIG. 2) transmitted by broadcaster 100 divide each demultiplexed channel of program content into program content segments, each identified by its associated program content segment number.

In the preferred embodiment, RF tuner 310 and digital demodulator 315 are capable of tuning to three channels simultaneously. When a subscriber's receiver 107 is in the OFF state but adequate power is available, receiver 107 uses this capability to do content updates on the three channels that have the highest quotient of subscriber preference to available content. Available content for a channel is defined as one hundred plus the number of seconds of program content stored in memory 332 that have not yet been heard and were recorded from that channel. (The extra one hundred is added to prevent division by zero and can take on other values in alternative embodiments.) Subscriber preference for a channel is defined as one hundred plus the number of seconds that the subscriber has listened to that channel aged with an aging factor of 0.999. (The extra one hundred is added so that even channels never listened to before have a small amount of program material stored in memory available for dropout-free listening and can take on other values in alternative embodiments.) At the end of each hour microprocessor 325 multiplies the subscriber preference value for each channel by 0.999 and adds the number of seconds that the channel was listened to that hour to obtain a new subscriber preference value for that channel. (If microprocessor 325 has not been able to do subscriber preference updates for N hours the multiplier is $0.999^N$ instead of 0.999.) This multiplier provides an exponential aging with a time constant of 1,000 hours (42 days) so that changing tastes, a changed subscriber (e.g., when a receiver 107 is sold), etc. do not cause the channel preference data to become outdated.

When a subscriber turns her receiver 107 to the ON state this specifies a channel, either a channel input by the subscriber or, if no channel is specified within two seconds (or some other threshhold), the last channel that was input before receiver 107 was last turned OFF. Microprocessor 325 provides tuning instructions 345 to RF tuner 310 and digital demodulator 315 telling them to use one of the three available tuning slots to tune to the specified channel (unless that channel is already being tuned) and uses the two remaining tuning slots to do content updates on the two other channels that have the highest quotient of subscriber preference to available content.

However receiver 107 usually does not output the real-time signal for the specified channel. Rather, microprocessor 325 first checks receiver commands 210 stored in memory 332 to check if the current program on the specified channel requires real-time output, as for a real-time sporting event. If so, microprocessor 325 outputs the real-time signal for the specified channel. If not, microprocessor 325 accesses memory 332 to determine if there are any stored content segments recorded from the specified channel.

If memory 332 contains any stored content segments recorded from the specified channel, microprocessor 325 accesses the oldest of these content segments and starts playing it from its beginning, using the new content segments being received in real-time to update the specified channel's program content stored in memory 332. However, only content segments that are dropout-free are stored.

If memory 332 does not contain any stored content segments recorded from the specified channel, or if microprocessor 325 exhausts all such stored content segments, microprocessor 325 causes the real-time signal for the specified channel to be output. To avoid an awkward transition from the end of the last stored content segment to the middle of a real-time content segment, microprocessor 325 always stores the last content segment received in real-time from the specified channel, whether or not it is dropout-free. When transitioning from stored content to real-time content, microprocessor 325 starts at the beginning of this last content segment received in real-time from the specified channel.

Even with this strategy, occasionally it will be necessary to transition to the middle of a real-time segment. For example, if there is only one 2-minute content segment for the specified channel in memory 332 and the program on that channel is in the middle of a 20-minute content segment, such a transition will be required. In that case, microprocessor 325 simulates a dropout of five seconds, after which it outputs the real-time segment. The simulated dropout prevents the subscriber from thinking his receiver 107 is broken.

Microprocessor 325 directs a first substream of the received bit stream to memory 332. The first substream stored in memory 332 includes a subset of receiver commands 210 and stored program content 211 using the strategy described earlier for deciding which channels to record. Stored program content can be either encrypted or unencrypted. Stored content includes an 8-bit header specifying the channel from which it was derived. This 8-bit header is used when microprocessor 325 needs to determine whether stored content is available for a channel.

Microprocessor 325 directs a second substream of the received bit stream to D/A converter 365 to be converted into an analog signal for amplification by audio amplifier 370 and output to loudspeaker 108. This second substream of the received bitstream includes unencrypted program content 211 that is being output in real-time.

Microprocessor 325 directs a third substream of the received bit stream to cryptoprocessor 335. This third substream of the received bitstream includes encrypted program content 211 that is being output in real-time. This third substream of the received bitstream also includes other encrypted data, such as encrypted keys of the month (described later) contained in certain receiver commands 210 known as user authorization messages. If the strategy described earlier for deciding when to output stored program content dictates the output of stored program content, microprocessor 325 reads that encrypted program content from memory 332 and directs it to either D/A converter 365 (if unencrypted) or to cryptoprocessor 335 (if encrypted). A 1-bit field in stored program content indicates whether it is encrypted (bit set to 1) or not (bit set to 0).

A fourth substream of the received bitstream, are receiver commands 210 retained by microprocessor 325. Not all of the four described substreams are necessary for the present invention. For example, the second substream (consisting of unencrypted content segements) is absent in alternative embodiments in which all content segments are encrypted.

User interface 360 includes
visual output (via visual display 380) to communicate information to the user;
audio output (via D/A converter 365, audio amplifier 370 and loudspeaker 108) to communicate information to the user and to output program content segments and additional information content segments (collectively "content segments") for audio reproduction;
an ON/OFF switch;
a volume control;
a channel selector;
ten preset buttons for rapidly choosing among ten channels set by the user (e.g., by holding a preset button for more than two seconds to set it to the currently active channel);
a band button for moving the ten preset buttons to one of three bands denoted A, B, and C, thereby expanding the presets from ten to thirty with the addition of just one button;
a pause button which, when depressed momentarily, tells receiver 107 to pause playing the current content segment (also muting receiver 107) and, when depressed again, tells receiver 107 to resume playing the current content segment;
a skip button which, when depressed momentarily, tells receiver 107 to skip the remainder of the current content segment or, when held down, to fast forward through the current content segment (the skip button is disabled during certain content segments, such as commercials);
a repeat button which, when depressed momentarily, tells receiver 107 to return to the beginning of the current content segment or, when held down, to rapidly rewind back through the current content segment;
a menu button to bring up menus for various user preferences (e.g., changing display characteristics, etc.); and
a buy button which, when activated, indicates the user wishes to purchase the audio content currently being played.

The skip and fast forward operations are disabled when certain content segments such as commercials are being played. These content segments are specified by setting a DoNotSkip bit in the content segment header to 1, while all other content segments have this bit set to 0. (In alternative embodiments, which content segments can be skipped are specified via receiver commands 210, preferably by specifying the 32-bit program content segment number of such content segments.) When the skip button is depressed, microprocessor 325 checks the DoNotSkip bit of the currently playing content segment and only carries out the requested operation if that bit is set to 0. To prevent the subscriber from thinking that his receiver 107 is broken when it fails to respond to the skip button, microprocessor 325 causes a message to be communicated to the user (e.g., by playing an audio announcement) which states that the skip button is currently disabled and, if tiered subscription service is offered, suggests that the subscriber purchase a higher tier subscription, after which microprocessor 325 causes the interrupted content segment to restart from its beginning.

FIG. 4 depicts the preferred embodiment of transmitter communication protocol software 220. A data segment (e.g., a program content segment) is operated on by basic packetizer 410 to output a sequence of raw packets 415, denoted $R_1, R_2, \ldots R_k$. For example, if data segment 405 consists of a three minute audio content segment encoded at 128 kbps, it is 2,880,000 bytes (2.88 MB) long. The packet length utilized by basic packetizer 410 is optimized based on the characteristics of the satellite radio channel over which the packets will be sent, with a 10 kilobyte (10 kB) packet length being typical. Such a packet is 80 kbits long and takes slightly over half a second to send at a typical data rate of 150 kbps. This is short enough that a fade out (as in driving through a null in the signal) during transmission of a packet is not likely, yet long enough that packet overhead, discussed below, is not an undue burden. Under these assumptions, the 2.88 MB data segment 405 is broken into two hundred eighty-eight raw packets 415 denoted $R_1, R_2, \ldots R_{288}$, each 10 kB long, so that k=288.

Erasure-Correcting Code

Raw packets 415 are encoded by erasure-correcting encoder 420 to produce processed packets 425, denoted $P_1, P_2, \ldots P_n$. In the preferred embodiment, processed packets 425 are the same length as raw packets 415 but n>k. To a first approximation, the satellite radio channel is either error-free (or has few enough errors that the forward-error-correcting code, or FEC, discussed later can correct them) or totally noisy. The essentially error-free state occurs when receiver 107 has a clear view of satellite transmitting antenna 105, while the totally noisy state occurs when receiver 107 is in a garage or tunnel or otherwise cannot see satellite transmitting antenna 105. The totally noisy state also occurs when receiver 107 is turned off. However, the preferred embodiment uses low power electronics and/or a backup battery so that receiver 107 can be turned on all the time for purposes of receiving the portion of the bitstream to be stored in memory 332. This "totally error-free or totally noisy" approximation to the satellite radio channel is an erasure channel (i.e., receiver 107 knows when errors can occur). A minor exception is the few packets that occur at the transitions between these two states. They are only partially erased but, in the preferred embodiment, are treated as total erasures.

Any erasure-correcting code known in the art can be used by erasure-correcting encoder 420, with the preferred embodiment using Reed-Solomon codes over $GF(2^{16})$. Some alternative embodiments are random codes, Tornado codes, and Luby Transform codes. See, for example, U.S. Pat. Nos. 6,614,366, 6,486,803, 6,411,223, 6,373,406, 6,320,520, and 6,307,487 and US Patent Applications 2001/0019310, 2002/0087685, 2002/0107968, 2002/0129159, 2002/0190878, 2003/0058958, 2003/0226089, 2004/0021588, 2004/0075593, and 2004/0101274. Another alternative embodiment uses the Reed-Solomon code in burst-error-correcting mode rather than erasure-correcting mode, which embodiment makes better use of partially erased packets.

Reed-Solomon codes are used to correct erasures on audio CD's. Erasures on audio CD's occur in blocks where a manufacturing defect or a speck of dust obliterates a small area of the CD. This small area, however, contains a large number of bits. The defect can be identified either by the SNR at the analog level or by error detecting bits after demodulation, transforming the problem into one of erasure correction. CD erasure correction uses a Reed-Solomon code over $GF(2^8)$ coupled with interleaving.

In the case of transmission of data packets over the satellite radio channel, erasures will mostly be packets lost due to the receiver 107 being unable to see satellite transmitting antenna 105 and again can be identified either by SNR at the analog level (e.g., signal quality indicator 340 of FIG. 3) and/or by error-correcting/detecting bits after demodulation. Reed-Solomon codes are in widespread use so that custom IC decoders (e.g., Philips Semiconductors part number SAA7207H_C1) are available and can be integrated into the preferred custom chip implementation of receiver 107's electronics. See also De Marzi et al U.S. Pat. No. 6,594,794 "Reed-Solomon decoding of data read from DVD or CD supports" and Huang U.S. Pat. No. 6,061,760 "Controller circuit apparatus for CD-ROM drives."

Unlike audio CD erasure correction, the preferred embodiment uses Reed-Solomon codes over $GF(2^{16})$ and is able to eliminate interleaving because of the stronger erasure-correcting properties of the larger field. Codeword symbols are 16 bits (2 bytes) long, and the block length of the code is $(2^{16}-1)=65,535$. For reasons described below, this code will usually be shortened by only sending some of the 65,535 possible symbols.

FIG. 5 depicts the structure of the preferred Reed-Solomon encoding performed by erasure-correcting encoder 420 on a 2.88 MB data segment 405, broken into 288 packets with 10 kB in each packet, such as the three minute audio content segment considered above. Since the Reed-Solomon code operates on symbols consisting of 2 bytes each, each 10 kB packet is 5,000 symbols long and is shown as a row in FIG. 5. The first raw packet 415 is the same as the first processed packet 425 (i.e., $R_1=P_1$) and consists of the first 10 kB or 5,000 2-byte-symbols of the 2.88 MB data segment 405. The second raw packet 415 is the same as the second processed packet 425 (i.e., $R_2=P_2$) and consists of the next 10 kB of the 2.88 MB data segment 405. The same is true up to and including the $288^{th}$ packet, which consists of the last 10 kB of the 2.88 MB data segment 405. The $289^{th}$ through $65535^{th}$ processed packets 425 (i.e., $P_{289}$ through $P_{65535}$) are functions of the 2.88 MB data segment 405 and, in general, are not equal to any raw packets. Rather, they are formed by treating each column of FIG. 5 as a Reed-Solomon codeword over $GF(2^{16})$, with each column encoded by the same Reed-Solomon encoder.

When a Reed-Solomon code with the above parameters is used on an erasure channel it is capable of recovering all 288 information symbols in a column when any 288 of the transmitted symbols in that same column have been received. Thus for example, the first column of FIG. 5 consists of the Reed-Solomon codeword $(s_{1,1}, s_{2,1}, s_{3,1}, \ldots s_{65535,1})$ with information symbols $(s_{1,1}, s_{2,1}, s_{3,1}, \ldots s_{288,1})$, and any 288 of the 65,535 encoded symbols $(s_{1,1}, s_{2,1}, s_{3,1}, \ldots s_{65535,1})$ determine the information symbols $(s_{1,1}, s_{2,1}, s_{3,1}, \ldots s_{288,1})$. The same is true for each column, so any 288 processed packets 425 determine the 288 raw packets 415 which constitute the 2.88 MB data segment 405. Reed-Solomon codes are optimal in this application since it is impossible to recover 2.88 MB of information with less than 2.88 MB of received data.

Luby et al (e.g., U.S. Pat. Nos. 6,614,366, 6,486,803, 6,411,223, 6,373,406, 6,320,520, and 6,307,487 and US Patent Applications 2001/0019310, 2002/0087685, 2002/0107968, 2002/0129159, 2002/0190878, 2003/0058958, 2003/0226089, 2004/0021588, 2004/0075593, and 2004/0101274) have developed other erasure-correcting codes sometimes called Luby Transform (LT) codes or digital fountain codes. These codes may require less decoding effort than Reed-Solomon codes, but at the expense of being slightly suboptimal in that they typically require 1-10% more than 2.88 MB of received data to reconstruct the 2.88 MB data segment 405. The preferred embodiment of the present invention uses Reed-Solomon codes because:

Bandwidth is a scarce resource and is likely to become even dearer relative to computational costs, making the bandwidth optimal Reed-Solomon codes a better choice than the computationally more efficient digital fountain codes.

Because the columns of FIG. 5 are all encoded with the same Reed-Solomon code and packets are either received error-free or erased, the decoding effort can be amortized over the 5,000 rows of FIG. 5, effectively dividing most of the computational burden by a factor of 5,000. This greatly reduces the advantage of more computationally efficient, but less bandwidth efficient codes.

Different strategies are used by transmitter communication protocol software 220 for different types of data segments 405 and, in particular, to determine the times, if any, that transmitter communication protocol software 220 transmits processed packets 425, $P_1$-$P_{65535}$. (For clarity of exposition, it will sometimes be said that transmitter communication protocol software 220 transmits packets whereas, to be precise, it causes them to be transmitted by modulator 205 and RF amplifier 206. Also for clarity of exposition, one or more processed packets 425 $\{P_i\}$ will sometimes be referred to merely as packets $\{P_i\}$.)

First consider the case where the 2.88 MB data segment 405 is of low priority (e.g., part of a software update for receiver 107 that is to be used a week or more in the future). Transmitter communication protocol software 220 first transmits $P_1$-$P_{289}$, the first 289 rows depicted in FIG. 5. When transmitting all but the last such packet, $P_{289}$, this strategy is no different from the simple method of transmitting data segment 405 with no encoding (other than that provided by transmitter packet processor 430 of FIG. 4, discussed in the section "Packet Overhead" below) since, as shown in FIG. 5, $P_1$-$P_{288}$ constitute the unencoded 2.88 MB data segment 405 (the 288 raw packets $R_1$-$R_{288}$). The last packet of this first transmission, $P_{289}$, is redundant and is only of value if one or more of packets $P_1$-$P_{288}$ are erased (e.g., if receiver 107 cannot see satellite transmitting antenna 105 during part of this transmission).

If receiver 107 can see satellite transmitting antenna 105 at the time of these transmissions and at most one packet of $P_1$-$P_{289}$ is erased by a momentary fade (e.g., multipath), then at least 288 of these 289 transmitted processed packets 425 are received. A Reed-Solomon decoder in receiver 107 (stored as software in memory 332 of FIG. 3, or implemented in special purpose hardware in receiver 107) can then recover the 2.88 MB data segment 405 and make it available to receiver 107.

The redundant $P_{289}$ was included in this first transmission since occasional fades occur on the satellite radio channel. If $P_{289}$ had not been included, a much larger fraction of receivers 107 would not have access to the 2.88 MB data segment 405 based on just this first transmission. Alternative embodiments transmit more than one or no redundant processed packets 425, depending on the characteristics of the satellite radio channel and the time urgency of receiver 107 receiving this data segment 405.

If receiver 107 can see satellite transmitting antenna 105 at the time of these transmissions (of $P_1$-$P_{289}$) but more than one packet of $P_1$-$P_{289}$ is erased by momentary fades, then less than 288 of these 289 transmitted processed packets 425 are received, less than 2.88 MB of information is received, and it is clearly impossible for the Reed-Solomon decoder in receiver 107 to recover the 2.88 MB data segment 405. However, in the case of multiple fades while receiver 107 can see satellite transmitting antenna 105, receiver 107 will typically need only a few additional packets from those not yet transmitted (i.e., $P_{290}$-$P_{65535}$).

If receiver 107 cannot see satellite transmitting antenna 105 at the time of these transmissions (of $P_1$-$P_{289}$), then none of $P_1$-$P_{289}$ are received and receiver 107 knows nothing about the 2.88 MB data segment 405.

After transmitter communication protocol software 220's first attempt to communicate data segment 405 by transmitting $P_1$-$P_{289}$, it waits 1-2 days before making additional transmissions. The time separation between these transmissions is randomized as opposed to, for example, once every 24 hours since some users will always be out of range of FM transmitter 130 at a particular time of day (e.g., when they are in an underground parking garage during work hours). Transmitter communication protocol software 220's second attempt to communicate data segment 405 transmits packets $P_{290}$-$P_{578}$ of FIG. 5. The 289 packets are just as informative about data segment 405 as were $P_1$-$P_{289}$ and the Reed-Solomon decoder is able to reconstruct data segment 405 from any 288 of the total 578 total packets transmitted in the first and second attempts. Thus, for example, receiver 107 can reconstruct the 2.88 MB data segment 405 if receiver 107 could not see satellite transmitting antenna 105 during the first attempted transmission, but loses at most one packet from the second attempted transmission; or there were multiple fades during both attempted transmissions, but at least 288 packets are received in total.

Additional attempts at transmitting the 2.88 MB data segment 405 proceed in a similar manner to the first and second. At some point in this process (the third in the preferred embodiment) fewer than 289 packets are sent since most receivers 107 will have received either enough or almost enough packets to reconstruct the 2.88 MB data segment 405.

In the above example, transmitter communication protocol software 220 used only a small fraction of the 65,535 possible packets shown in FIG. 5. Hence erasure-correcting encoder 420 uses a shortened Reed-Solomon code as opposed to a complete Reed-Solomon code. Operating over $GF(2^{16})$ allows a larger number of packets than will be needed in all or almost all situations. Alternative embodiments can operate over smaller or larger finite fields than $GF(2^{16})$.

The above example was illustrative of transmitter communication protocol software 220 transmitting a low priority data segment 405. Transmitter communication protocol software 220 transmits different numbers of packets on each transmission attempt, depending on the time urgency of data segment 405, bandwidth availability, characteristics of the satellite radio channel, etc. If a 2.88 MB data segment 405 had a high time urgency, more than 289 packets are sent on the first attempt to allow reconstruction with more than one erased packet, and additional attempts at transmission are done within hours, rather than the 1-2 days of the former example.

Transmitter Packet Processing

Transmitter packet processor 430 of FIG. 4 operates on processed packets 425 ($P_1, P_2, \ldots P_n$) to produce data packets 435, denoted $D_1, D_2, \ldots D_n$. Data packets 435 are then transmitted to receivers 107 at the times specified in the immediately preceding section using modulator 205, RF amplifier 206, and ground transmitting antenna 101 of FIG. 2 via the satellite radio channel.

Each data packet 325 is slightly longer than each processed packet 425 due to overhead introduced by transmitter packet processor 430. In the preferred embodiment the overhead is contained in a packet header which consists of:

an 11-bit Barker code synchronization field (e.g. 11100010010);

a 5-bit version number field specifying the protocol version number;

an 8-bit packet type field;

a 16-bit packet length field;

a 32-bit data segment ID field;

a 16-bit data segment length field;

a 16-bit packet ID field; and a 64-bit error correction and detection field.

Barker codes, also called Barker sequences, are known in the art as having desirable properties for synchronization. Digital demodulator 315 of FIG. 3 includes an analog or digital matched filter for the Barker code used. In the absence of noise, the matched filter outputs a large signal only at the end of the Barker code which digital demodulator 315 uses in known techniques to acquire synchronization with broadcaster 100 of FIG. 1.

The 5-bit protocol version number field is used so that receiver 107 can tell if it is using outdated protocol software, in which case receiver 107 must wait for an update of the protocol software, which update will be transmitted using an earlier protocol. If binary protocol number 11111 is reached, the next protocol number is taken cyclically to be number 00000. Protocols change infrequently enough that this cyclic nature of protocol numbering has virtually no chance of confusing receiver 107.

The 8-bit packet type field allows up to 256 different types of packets, for example different kinds of program content segments, software updates, and various types of receiver commands.

The 16-bit packet length field gives the length of the packet in bytes, allowing packet lengths up to 65,535 bytes. In alternative embodiments, packet lengths are specified in multiples of some fixed number of bytes, bits or other entities. If, for example, this fixed number is 2 and represents 2 bytes, then the 16-bit packet length field specifies half of the packet length in bytes, rounded up. Partial packets are filled with zeros or using other techniques known in the art.

For packets conveying content segments the 32-bit data segment ID field specifies a content segment number for the content segment being conveyed. For packets conveying information other than content segments, the 32-bit data segment ID field can be used for other purposes or filled with zeros or any other value.

The Reed-Solomon decoder in receiver 107 which corrects erasures needs to know k, the number of raw packets associated with data segment 405 of FIG. 4 (e.g., k=288 in FIG. 5). The number of raw packets associated with data segment 405 is specified by the 16-bit data segment length field, allowing up to $2^{16}$=65,536 packets per data segment.

The 16-bit packet ID field specifies the packet number within a data segment 405. For example, FIG. 5 depicts the 65,535 packets that can be used to convey a 2.88 MB data segment, and this field will contain the index of the packet (e.g., 290 for $P_{290}$ shown in FIG. 5).

The 64-bit error correction and detection field is redundant information used to correct single errors and detect virtually all multiple errors. When receiver 107 can see satellite transmitting antenna 105, the satellite radio channel typically has a bit error rate (BER) on the order of 1E-6. Processed packets 425 are 80,168 bits long (80,000 bits of data plus 168 bits of overhead as specified above for the various header fields), so the probability that a packet is received error-free is $0.999999^{80168}$=92.3%; the probability of a single error is $80168 * 0.999999^{80167} * 1E-6$=7.4%; and the probability of two or more errors is 0.3%. Hence 99.7% of received packets are error-free after application of a single error-correcting decoder, and only about one packet in 300 has uncorrectable errors.

In almost all situations, the undetected error rate P(e) can be upper-bounded by computing P(e) for a totally noisy channel. On a totally noisy channel, all $2^{80168}$ possible received points are equally likely, there are $2^{80104}$ codewords, and each codeword has a decoding region of volume 80169 (1 point for the codeword plus 80168 points that differ in one position from the codeword). Hence, on a totally noisy channel $$P(e)=2^{80104}*80169/2^{80168}=80169*2^{-64}=4.3E-15$$

and undetected errors are virtually non-existent.

Any error-correcting and detecting code known in the art can be used, with the preferred embodiment being a shortened binary BCH code. Since unshortened binary BCH codes have lengths which are one less than a power of two and processed packets 425 are 80,168 bits long, the unshortened block length of the BCH code is one less than the next highest power of two, or $2^{17}-1$=131,071 bits. As is known in the art, the BCH code is shortened by taking the first 131,071−80,153=50,918 bits to be zero and not sending them since they are known a priori. Methods for choosing the generator polynomial of this code and implementing the code in hardware are also known in the art. See, for example, R. Gallager, *Information Theory and Reliable Communication*, Wiley, N.Y., 1968, pp. 224-225 for the encoding circuitry (FIG. 6.5.5 being preferred) and pp. 238-239 for choosing the generator polynomial.

Receiver (Receiver) Packet Processing

Figure 6:
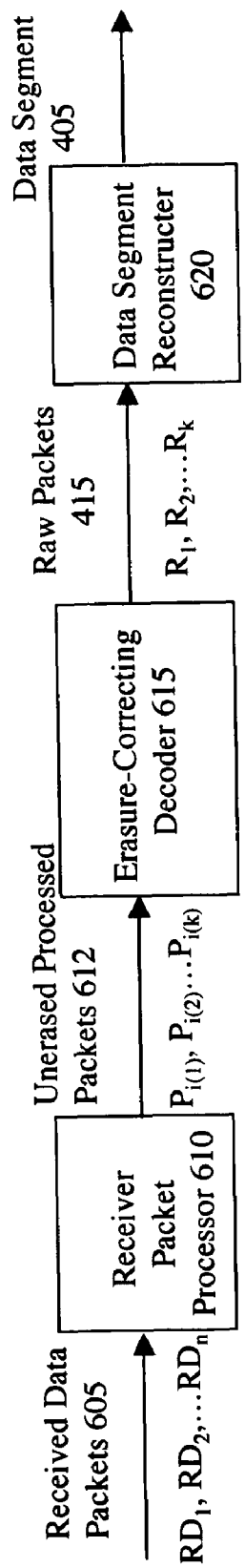
FIG. 6 is a block diagram of an exemplary embodiment of a receiver (receiver) communication protocol.

FIG. 6 depicts the operation of receiver communication protocol software 326 of FIG. 3 and largely mirrors FIG. 4 which depicts the transmitter communication protocol software 220. Received data packets 605, $RD_1$-$RD_n$, are noisy versions of (transmitted) data packets 435, $D_1$-$D_n$, and are input to receiver packet processor 610 for processing. While the preferred embodiment makes use of signal quality indicator 340 of FIG. 3 to only input received data packets 605 that are of sufficient quality, for simplicity of exposition the embodiment depicted in FIG. 6 presents all received data packets 605.

Receiver packet processor 610 makes use of various fields in the 168-bit packet header described in the section "Transmitter Packet Processing" immediately above.

To acquire synchronization, receiver packet processor 610 first computes the Hamming distance (number of bit differences) between the received and transmitted versions of the 11-bit Barker code synchronization field 11100010010 and uses these differences in known techniques to correct any synchronization errors. For example, if the receiver should slip one bit late the leftmost bit is lost and instead of 11100010010 it will see 1100010010X where X is the first bit of the next field. Depending on the value of X, this will cause five or six errors in the received Barker code and a perceived bit error rate (BER) of approximately 50%. In contrast, when the receiver is synchronized with the transmitter, the perceived BER will be the BER of the satellite radio channel, typically 1E-6.

Microprocessor 325 can use any technique known in the art for acquiring synchronization. For example, when receiver 107 is first powered up, microprocessor 325 can wait for signal quality indicator 340 to indicate that receiver 107 can see satellite transmitting antenna 105, at which point microprocessor 325 looks for occurences of the 11 bit Barker code 11100010010 in the received bit stream stored in buffer 320. Whenever this sequence occurs, microprocessor 325 then uses the other fields in the presumed packet header to process the presumed packet under direction of receiver packet processor software 610 as detailed below. If the error correction and detection decoder described below does not indicate an uncorrectable error, then the presumed packet is taken as a valid packet and synchronization is acquired. Since, as derived in the immediately preceding section, the error correction and detection decoder has at most a 4.3E-15 probability of not detecting an uncorrectable error, the probability of a false synchronization is also at most 4.3E-15 which, for all practical purposes, is zero.

Once initial synchronization is acquired in this manner, microprocessor 325 monitors the BER on the Barker code portion of successive packets and, if this BER is greater than a threshhold, 1E-3 in the preferred embodiment, microprocessor 325 tries moving synchronization plus or minus one bit, then plus or minus two bits, looking for a BER less than the threshhold. If none of these attempts produces a BER less than the threshhold, microprocessor 325 assumes synchronization has been totally lost and reverts to the synchronization acquisition strategy outlined above.

Receiver packet processor 610 next uses the 16-bit packet length field to determine the end of the packet and computes the syndrome of the received packet as the XOR of the computed 64-bit error correction and detection field with the received value, again using the circuitry depicted in Gallager, op cit, page 225, FIG. 6.5.5. If the 64-bit syndrome is all 0's then the received packet is error free or has undetectable errors, but since the undetected error rate is less than 4.3E-15, the packet can safely be assumed to be error-free.

If the syndrome has any 1's then an error correction phase is attempted by microprocessor 325 (or, in alternative embodiments, special purpose circuitry). The error-correcting phase can use any method known in the art, with the preferred embodiment using the known technique of a table lookup on non-zero syndromes to specify the single bit location to correct. Any such corrected packets then have their syndromes recomputed and accepted as valid only if the recomputed syndrome is all 0's. Any packets which fail to pass this test are discarded, considered erased, and not operated on further. (Alternative embodiments make use of these packets instead of discarding them, for example, by using the Reed-Solomon code in burst error-correcting mode instead of erasure-correcting mode.)

Receiver packet processor 610 next compares the 5-bit protocol number field with the operative protocol number that receiver 107 was last instructed to use by a receiver command 210. Except in rare circumstances, the two values will agree. If they disagree, receiver 107 knows that it has missed a protocol update and must wait until the protocol update is received. Until the protocol is updated receiver 107 also indicates an error condition on visual display 380.

After the above operations, receiver packet processor 610 waits until it has k (e.g., k=288 in FIG. 5) unerased processed packets 612, denoted $P_{i(1)}, P_{i(2)}, \ldots, P_{i(k)}$, and passes these unerased processed packets 612 to erasure-correcting decoder 615. If there were no erasures (uncorrectable errors) on the satellite radio channel, $P_{i(1)}, P_{i(2)}, \ldots, P_{i(k)}$ are the same as processed packets 425 in FIG. 4. But because the satellite radio channel is subject to erasures, the indices of these packets [i(1), i(2), ..., i(k)] specified by their 16-bit packet ID fields are not necessarily consecutive integers. Erasure-correcting decoder 615 uses techniques known in the art for correcting erasures with a Reed-Solomon code, for example solving k simultaneous equations in k unknowns over $GF(2^{16})$ via a matrix inversion. Since each column in FIG. 5 (where k=288) represents a Reed-Solomon codeword, once the equations are solved for column 1, the same solution coefficients can be applied to the remaining 4,999 columns, so that portion of the computational effort per recovered symbol is reduced by a factor of 5,000.

After correcting erasures, the output of erasure-correcting decoder 615 is $(R_1, R_2, \ldots R_k)$, the sequence of raw packets 415, also depicted in FIG. 4 prior to transmission. Raw packets 415 are then assembled into data segment 405 by data segment reconstructer 620 and stored in memory 332 of FIG. 3, along with data segment 405's type (determined from the 8-bit packet type field in the packet header), data segment ID number (determined from the 32-bit data segment ID field in the packet header), and length in bytes (obtained as the product of the 16-bit packet length and the 16-bit data segment length fields in the packet header, or in an alternative embodiment, by including this length as a data segment header). Data segment 405 may be in encrypted or unencrypted form, depending on its type and economic value. For example, commercials will typically be transmitted and stored in unencrypted form, while music will typically be encrypted.

Cryptoproccesor Detail

Figure 7:
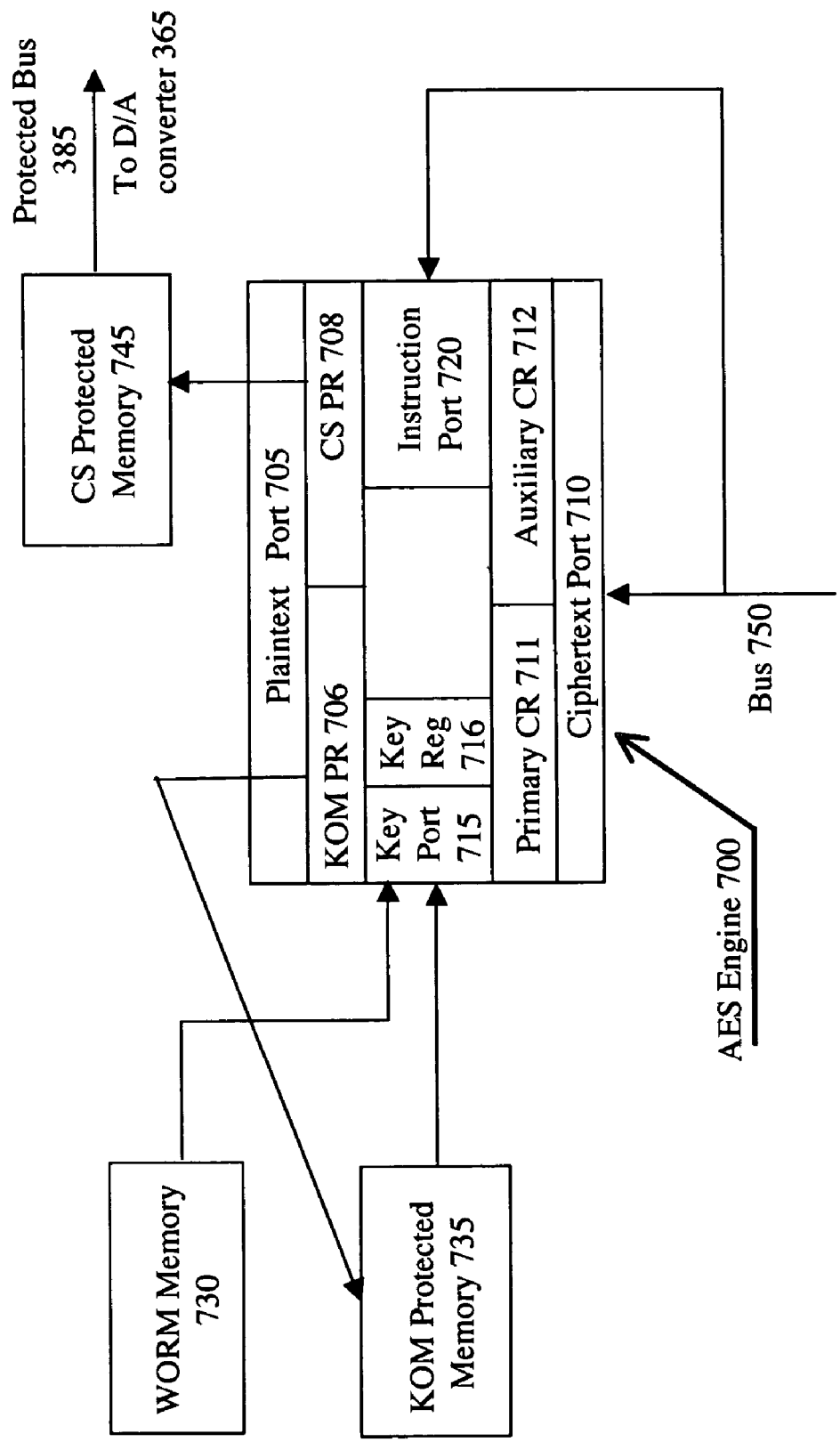
FIG. 7 is a block diagram of an exemplary embodiment of a cryptoprocessor.

FIG. 7 depicts cryptoprocessor 335 of FIG. 3 in greater detail. Cryptoprocessor 335 is preferably part of a custom chip implementation of the electronic portion of receiver 107. AES engine 700 implements NIST's AES algorithm as specified in FIPS PUB 197. As previously defined in the section "Encryption Operations," $C=E_K(P)$ denotes the ciphertext C produced by AES encrypting the 128-bit plaintext block P under action of key K; and $P=D_K(C)$ denotes the plaintext P produced by AES decrypting the 128-bit ciphertext block C under action of key K. As implied by this notation $P=D_K(E_K(P))$ since decryption under key K is the inverse operation to encryption under key K. As described previously, receiver 107 receives the following encrypted data:

$E_{DK}$(KOM) where DK is receiver 107's Device Key written into WORM (Write Once, Read Many times) memory 730 at the time of manufacture and KOM is one of the Keys Of the Month for the tier of service to which receiver 107 is entitled. (Alternative embodiments can entitle a receiver 107 to multiple tiers of service.) $E_{DK}$(KOM) is transmitted as part of a receiver command 210, in this case a user authorization message.

$E_{KOM}$(CS) where CS is a Content Segment such as a song.

Receiver 107 recovers an encrypted Content Segment by:
first decrypting an encrypted Key Of the Month using its Device Key and storing the result in KOM protected memory 735; and
then decrypting the encrypted Content Segment using the now decrypted Key Of the Month and storing the result in CS protected memory 745 for output on protected bus 385 also depicted FIG. 3.

As can be seen from the above two operations, receiver 107 performs only decryption operations. (Broadcaster 100 performs the corresponding encryption operations.) Therefore, while alternative embodiments also use AES in encryption mode, the preferred embodiment of receiver 107 depicted in FIG. 7 only uses AES in decryption mode.

AES engine 700 has four ports:
a plaintext port 705;
a ciphertext port 710;
a key port 715; and
an instruction port 720.

Since receiver 107's AES engine 700 operates only in decryption mode, ciphertext port 710 is an input port (i.e., no data can flow out of it) and plaintext port 705 is an output port (i.e., no data can flow into it). Key port 710 is an input port since no other element of receiver 107 has a legitimate reason for trying to read a key out of AES engine 700. Rather, once a key is input to key port 710, it is stored in key register 716, internal to AES engine 700 and which can only be read by AES engine 700 when instructed to decrypt a 128-bit ciphertext block by an instruction input to instruction port 720. Instruction port 720 is also an input port.

Preferably, as depicted in FIG. 7, AES engine 700's plaintext port has two physically distinct data paths connected to two physically distinct plaintext registers. Key of the month plaintext register 706 (abbreviated as KOM PR 706) and content segment plaintext register 708 (abbreviated as CS PR 708). These two plaintext registers are used to temporarily store the result of decryptions by AES engine 700. As indicated by the names of their associated plaintext registers, these two plaintext registers and data paths are used to store and communicate two different types of computed plaintexts with different economic values:
Keys Of the Month (KOMs) and
Content Segments (CSs) or other data.

The reason for having two physically distinct plaintext registers and data paths is to segregate these different computed plaintexts to minimize the probability that an opponent can learn the extremely valuable KOM. Further, the custom chip implementation of receiver 107's electronics is preferably designed with higher security (e.g., masking of data paths by metal layers) on the more valuable KOM PR 706 and its data path.

A receiver 107's Device Key (DK) is the most sensitive data that it stores since, if a pirate were to learn DK, he could compute KOMs for every month and tier of service to which that receiver 107 was authorized to have access. These computed KOMs could then be shared with specially produced "pirate receivers" which bypass any other security mechanisms (e.g., checking that the digital signature with a user authorization message is valid). While a separate plaintext register is not needed for DK since it is burned into WORM memory 730 at the factory and therefore never computed, WORM memory 730 must be protected. In particular, the data path from WORM memory 730 to key port 715 is given a high level of protection (e.g., a grounded metal overlay to foil attempts to tap into this data path with a microprobe).

AES engine 700 is a special purpose microprocessor which performs only cryptographic operations. Hence the name "cryptoprocessor" for element 335 of FIG. 3. (Cryptoprocessor 335 includes all of the elements of FIG. 7, not just AES engine 700, just as a normal microprocessor typically includes internal memory and registers.) The instruction set for AES engine 700 is extremely small and specific, allowing for a much higher level of security than with a normal microprocessor. Instructions executed by AES engine 700 are specified by microprocessor 325 of FIG. 3 and microprocessor 325 carries out corresponding operations on public (as opposed to secret) information.

The first instruction in AES engine 700's instruction set computes a 128-bit Key Of the Month for the tier of service that broadcaster 100 has authorized receiver 107 to receive. This instruction takes the form

DECRYPT_KOM(LOCATION, KOM#)

which causes microprocessor 325 to:

retrieve the 128-bit Encrypted Key Of the Month EKOM, 4-bit tier of service TIER, and 4-bit month relative to the current date and time MONTH from the location in memory 332 specified by the bit string LOCATION, use the date and time that EKOM was received to translate the relative 4-bit MONTH field into an absolute 16-bit month field (allowing 65,536 months or over 5,000 years before cycling), store TIER and the computed 16-bit month field in a table of KOM information stored in memory 332 along with the location KOM# in KOM protected memory 735 where the decrypted KOM will be stored (see immediately below and note that KOM itself is never stored in memory 332), and communicate EKOM to AES engine 700's ciphertext port 710 via bus 750 (to enhance security bus 750 can convey information from less secure parts of receiver 107 to AES engine 700's ciphertext port, but to no other part of AES engine 700, and bus 750 cannot be used to retrieve information from any part of AES engine 700);

and causes AES engine 700 to store the 128 bits of EKOM in primary ciphertext register (Primary CR) 711, communicate the 256-bit Device Key DK from WORM memory 730 to AES engine 700's key port 715 and store DK in key register 716, execute an Electronic Code Book AES decryption to produce $D_{DK}(EKOM)$ which stores the resulting 128-bit decrypted Key Of the Month KOM in KOM PR 706, and communicate KOM from KOM plaintext register 706 via plaintext port 705 to KOM protected memory 735 where it is stored in location KOM#, erasing any previous contents of that location.

KOM protected memory 735 can hold more than one Key Of the Month for two reasons:

As noted earlier, higher tier subscribers will need more than one KOM since content segments accessible to both higher tier and lower tier subscribers will be encrypted in a lower tier KOM.

KOM's for one or more future months can be predelivered to subscribers who have paid in advance and be ready for use immediately when the month changes.

WORM memory 730 is a write-once semiconductor memory so that, after its Device Key DK is burned into it at the factory, its contents cannot be changed. This prevents a group of pirate users from changing their DK's to all be the same and then illegally sharing user authorization messages with one another, with only one of them paying for service. WORM memory technology is known in the art of semiconductor fabrication and is used, for example to burn unalterable serial numbers into microprocessors, and to increase memory chip yields by burning in information on defective portions of memory which can then be avoided. One such WORM approach is to use fuses which are blown (written to) by a higher than normal voltage. It is "write once" since, once a fuse is blown, it cannot be returned to its original state.

The second instruction in AES engine 700's instruction set produces a decrypted Content Segment Block CSB which is part of a content segment CS for the tier of service that broadcaster 100 has authorized receiver 107 to receive in a given month, and then stores that decrypted Content Segment Block in CS protected memory 745 for output on protected bus 385 which also is depicted in FIG. 3. This instruction takes the form

DECRYPT_CSB(LOCATION1, LOCATION2, KOM#)

which causes microprocessor 325 to:

retrieve the 128-bit Encrypted Content Segment Block ECSB from the location in memory 332 specified by the bit string LOCATION1, if LOCATION2≠0, retrieve a 128-bit Initialization Vector (as defined in Cipher Block Chaining or CBC mode) IV from the location in memory 332 specified by the bit string LOCATION2 (LOCATION2=0 indicates that this Encrypted Content Segment Block is not the first so that an IV is not needed for its decryption; rather the preceding Encrypted Content Segment Block, which will already be stored in AES engine 700 from the previous instruction, is used in place of IV), communicate ECSB to AES engine 700's ciphertext port 710 if LOCATION2≠0, communicate IV to AES engine 700's ciphertext port 710, if LOCATION2=0, communicate IV=0 to AES engine 700's ciphertext port 710 (IV=0 is not allowed as an Initialization Vector, so this tells AES engine 700 that an IV is not being used);

and causes AES engine 700 to store ECSB in primary ciphertext register 711, if IV≠0, store IV in auxiliary ciphertext register 712, if IV=0, do not disturb the current contents of ciphertext register 712, if KOM# differs from the previous value used, communicate a 128-bit Key of the Month KOM from location KOM# in KOM protected memory 735 to AES engine 700's key port 715 and store KOM in key register 716 (if KOM# is the same as the previously used value, the required KOM is already in key register 716), execute an AES decryption $D_{KOM}(ECSB)$ which stores the resulting CBC decrypted Content Segment Block CBC_CSB in CS plaintext register 708, XOR the contents of CS plaintext register 708 (CBC_CSB) with the contents of auxiliary ciphertext register 712 to produce the original Content Segment Block CSB and store the result in CS plaintext register 708 (since CBC mode encrypts the current plaintext block XORed with the previous ciphertext block, which previous ciphertext block is now stored in auxiliary ciphertext register 712), communicate CS from CS plaintext register 708 via plaintext port 705 to CS protected memory 745 where it is then output on protected bus 385 which, as shown in FIG. 3, will convey it to D/A converter 365, and transfer ECSB from primary ciphertext register 711 to auxiliary ciphertext register 712 (since in CBC mode, auxiliary ciphertext register 712 stores the previous ciphertext block).

The third (and in the preferred embodiment, the last) instruction in AES engine 700's instruction set causes AES Engine 700 to erase a KOM from KOM protected memory 735. This instruction takes the form

ERASE_KOM(KOM#)

which causes microprocessor 325 to erase the entry corresponding to KOM# in the table of KOM information stored in memory 332 and causes AES Engine 700 to erase the contents of KOM# in KOM protected memory 735. Erasing KOMs that are not needed in the immediate future inhances security. An alternative, less secure embodiment keeps KOMs until protected KOM memory 735 is full, at which point unneeded KOMs are erased, for example on a FIFO basis.

Alternative Embodiments

The foregoing descriptions of specific embodiments of the present invention are presented for the purposes of illustration and description. They are not intended to be exhaustive or to limit the scope of the invention and many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. For example:

Although the present invention has been illustrated in connection with satellite radio, it can be used in connection with any broadcast or media distribution system and, in particular with terrestrial radio and television services. The present invention is also applicable to Internet radio and similar methods of broadcast, in which case multiplexing is accomplished via packetization and what is herein termed the receiver's demodulator is part of its modem (modulator-demodulator pair) or other signal reconstruction apparatus. Hence, used herein:

the term "multiplex" and its various derivatives (multiplixed, multiplexor, etc.) includes any method of combining two or more types of information, or two or more data streams, in any manner whatsoever, whether or not the method includes the word root "multiplex";

the term "demodulator" and its various derivatives (demodulate, demodulated, etc.) includes any device for reconstructing a signal, whether or not the device includes the word root "demodulate";

the term "receiver" includes devices, whether or not the the word "receiver" is included in their names (e.g., PC's, playback devices, iPod, MP3 player, etc.);

the term "transmitter" includes devices, whether or not the word "transmitter" is included in their names (e.g., head end, distribution center, etc.); and the term "broadcast system" includes media distribution systems, whether or not the word "broadcast" is included in their names (e.g., Internet radio, music subscription services, etc.).

Other names and words used herein are intended to be interpreted in a similar manner.

While the preferred embodiment utilizes an extremely secure cryptoprocessor, alternative embodiments can use less secure cryptoprocessors (e.g., a conventional microprocessor and encryption software), with an attendant reduction in security level. While the preferred embodiment utilizes push buttons for sensing user input to user interface 360, other means such as voice commands may be used instead. Instead of erasing content segments from memory immediately after being heard, if space permits, content segments can be saved for later use. In another alternative embodiment, the subscriber can over-ride the dropout protection afforded by the present invention and force real-time playback, so that the present invention is an option, not the only mode of operation.

With many other variations also possible within the spirit of the present invention, it is therefore intended that the scope of the invention be defined by the following claims and their equivalents.

What is claimed is:

1. A receiver comprising:
   a demodulator;
   a memory;
   a receiver controller; and
   a user interface;
   wherein:
      said demodulator produces program segments representative of portions of two or more program channels transmitted by at least one broadcaster, the transmitting being of digital information including transmitting error correction and detection information on the program segments coded according to an error-correcting and detecting code;
      said receiver controller checks the program segments from said demodulator, generates dropout-free program content, and stores at least a portion of said program segments in said memory, the storing including storing of dropout-free program content, wherein the checking of the program segments includes checking the error correction and detection information such that the dropout-free program content has passed the checking of the error correction and detection information;
      said receiver controller stores channel content information in said memory indicative of the respective program channel of the two or more program channels that is associated with each segment of the dropout-free program content stored in said memory;
      said user interface specifies a program channel;
      said receiver controller creates an output signal that includes one or more program segments associated with the specified program channel;
      said receiver controller performs a program channel content check which depends at least in part on said channel content information, said channel content check producing an acceptable result or an unacceptable result;
   wherein program content segments to be stored in said memory are checked to make sure they are dropout-free before being stored,
   and wherein:
      if said program channel content check produces the acceptable result, said receiver controller includes in said output signal at least a portion of the program content segments stored in said memory which is associated with said specified program channel in preference to other program segments associated with said specified program channel, and if said program channel content check produces the unacceptable result, including the result that there is no usable, stored, dropout-free content available for the specified program channel, or the result that said other program segments on said specified program channel require real-time output, said receiver controller includes in said output signal at least one of said other program segments associated with said specified program channel.

2. A receiver as in claim 1 wherein:

said checking of the program segments from said demodulator to generate dropout-free program content comprises:

validating that a program segment is complete and error-free to a high degree of certainty, including passing the checking of the error correction and detection information.

3. A receiver as in claim 2 wherein said high degree of certainty is at least 99.99%.

4. A receiver as in claim 1 wherein:

said other program segments associated with said specified program channel are one or more essentially real-time program segments; and the dropout-free content segments stored in memory are complete.

5. A receiver as in claim 4 wherein said stored at least a portion of the program content segments appears in said output signal more than 60 seconds after being produced by said demodulator.

6. A receiver as in claim 4 wherein said stored at least a portion of the program content segments appears in said output signal more than 60 minutes after being produced by said demodulator.

7. A receiver as in claim 1 wherein:

said program channel content check produces the acceptable result if there is drop-out-free content stored in said memory associated with said specified program channel; and said other program segments associated with said specified program channel are essentially real-time program segments.

8. A receiver as in claim 1 wherein:

said channel content information is at least partly dependent on one or more receiver commands;

at least a portion of said receiver commands identify some of said program segments as real-time program segments and others of said program segments as non-real-time program segments;

said unacceptable result includes that said receiver commands identify that the program segments on the specified program channel require real-time output, such that said receiver controller prefers program segments stored in said memory which are associated with said specified program channel only if said program channel content check indicates that said program segments stored in said memory which are associated with said specified program channel are non-real-time program segments.

9. A receiver as in claim 8 wherein said non-real-time program segments comprise music.

10. A receiver as in claim 1, wherein the receiver has an ON state and OFF state, and wherein when said receiver is in the OFF state:

said demodulator produces program segments representative of portions of two or more program channels;

said receiver controller stores in said memory at least a portion of said program segments produced while said receiver is in the OFF state; and said receiver controller stores channel content information in said memory indicative of two or more program channels associated with two or more program segments stored in said memory while said receiver is in the OFF state.

11. A receiver as in claim 1 wherein:

if said user interface specifies a first program channel of said two or more program channels, the preferred program segments are associated with said first program channel and said other program segments are associated with said first program channel; and if said user interface specifies a second program channel of said two or more program channels, the preferred program segments are associated with said second program channel and said other program segments are associated with said second program channel.

12. A receiver as in claim 1, wherein said demodulator produces one or more receiver commands transmitted by said at least one broadcaster and associated with at least some of said program segments produced by said demodulator, wherein said user interface is configured to generate commands to carry out a plurality of functions, including at least one of a skip function and a fast forward function, and wherein said receiver controller stores skip content information in said memory, said skip content information being:

derived at least in part from said receiver commands and associated with at least one of said produced program segments; and configured to cause said receiver controller to inhibit one or more of said plurality of functions of said commands generated by said user interface when at least one program segment associated with said skip content information and stored in said memory is included in said output signal.

13. The receiver of claim 12, wherein the one or more functions that may be inhibited by said skip content information apply to program segments that are commercials.

14. A receiver comprising:

a demodulator;

a memory;

a receiver controller; and a user interface configured to generate commands to carry out a plurality of functions;

wherein:

said receiver in operation produces program segments from one or more program channels transmitted by at least one broadcaster and receiver commands transmitted by said at least one broadcaster, said receiver commands dividing each channel of program content into program content segments, wherein in the program channels transmitted include digital information that includes error correction and detection information of the program segments coded according to an error-correcting and detecting code;

said receiver controller in operation creates an output signal;

said receiver controller checks at least a portion of said program segments, including checking the error correction and detection information;

said receiver controller stores the at least a portion of said program segments that has passed the checking of the error correction and detection information, the storing being in said memory;

said receiver controller stores channel content information in said memory indicative of the respective program channel from which was produced each program segment of said portion of said program segments stored in said memory; and said receiver controller stores skip content information in said memory, said skip content information being:

derived at least in part from said receiver commands and associated with at least one of said produced program segments; and causes said receiver controller to inhibit one or more of said plurality of functions of said commands generated by said user interface when at least one program segment associated with said skip content information and stored in said memory is included in said output signal;

said user interface specifies a program channel;

said output signal includes one or more program segments associated with the specified program channel;

said receiver controller in operation performs a program channel content check which depends at least in part on said channel content information, said program channel content check producing an acceptable result or an unacceptable result;

and wherein, if said program channel content check produces the acceptable result:

said receiver controller includes in said output signal at least a portion of the program segments stored in said memory which are associated with said specified program channel in preference to one or more other program segments associated with said specified program channel.

15. The receiver of claim 14 wherein the one or more functions that may be inhibited by said skip content information include at least one of a fast forward function and a skip function.

16. The receiver of claim 15 wherein the one or more functions that may be inhibited by said skip content information apply to program segments that are commercials.

17. The receiver of claim 14 wherein said receiver controller checks whether any segment of said program segments from one or more program channels is an essentially real-time segment, and wherein said one or more other program segments are one or more essentially real time program segments.

18. The receiver of claim 17 wherein said one or more essentially real time program segments are included in said output signal within 1 minute of their being produced by said demodulator.

19. The receiver of claim 17 wherein said one or more essentially real time program segments are included in said output signal within 60 minutes of their being produced by said demodulator.

20. A receiver as in claim 14, wherein the receiver has an ON state and OFF state, and wherein when said receiver is in the OFF state:

said demodulator produces program segments representative of portions of one or more program channels;
said receiver controller stores at least one program segment in said memory; and
said receiver controller stores channel content information in said memory indicative of the program channel(s) associated with said at least one program segment stored in said memory.

21. A method of operating a receiver, comprising:

receiving in the receiver content transmitted from a broadcaster corresponding to at least one program channel of a plurality of program channels of content transmitted by the broadcaster, the content transmitted by the broadcaster including digital information that includes transmitting error correction and detection information coded according to an error-correcting and detecting code;

checking the received content to generate dropout-free content segments, the checking including checking the error correction and detection information such that the dropout-free content segments have passed the checking of the dropout-free content segments' error correction and detection information, wherein program content segments to be stored in a memory are checked to make sure they are dropout-free before being stored;

storing one or more dropout-free content segments to form stored dropout-free content, the dropout-free content segments having associated program channel information;

storing program channel information indicative of the respective program channel of the program channel(s) associated with each segment of the stored dropout-free content segments;

for a specified program channel of the at least one program channel to which at least some of the received content corresponds, performing a program channel content check which depends at least in part on the program channel information, said program channel content check producing an acceptable result or an unacceptable result, if the program channel content checking produces the acceptable result, outputting at least a portion of the program content segments stored in the memory which is associated with the specified program channel in preference to other program segments associated with the specified program channel, and if the program channel content check produces the unacceptable result, including the result that there is no usable, stored, dropout-free content available for the specified program channel, or the result that said other program segments on said specified program channel require real-time output, outputting at least one of the other program segments associated with the specified program channel.

22. The method of claim 21, wherein the receiving is of respective content transmitted on more than one program channel.

23. The method of claim 21, wherein the other program segments associated with the specified program channel are one or more essentially real-time program segments.

24. The method of claim 21, wherein the outputting of at least a stored portion of the program content outputs the oldest portion of the stored content that has not yet been output and which is at least one segment long.

25. The method of claim 21, wherein the receiving includes receiving commands transmitted by the broadcaster indicative of whether the received content is for real-time output, and wherein the acceptable result includes that the commands indicative of whether the received content is for real-time output do not indicate that the received content is for real-time output, such that the outputting outputs received content indicated to be for real-time output in preference to stored content.

26. The method of claim 21, further comprising:
storing at least one received content segment of the specified program channel irrespective of whether it is dropout-free in order to smooth transitioning between outputting received real-time content and outputting stored dropout-free content for the specified program channel.

27. The method of claim 21, wherein the receiver has an ON state and an OFF state, and wherein the receiving, the checking the received content to generate dropout-free content, and the storing of one or more dropout-free content segments and the channel information can occur in both the ON state and the OFF state.

28. The method of claim 21, wherein the specified program channel is selected by a user via a user interface included in the receiver.

29. The method of claim 21, wherein the receiver has an ON state and an OFF state wherein the specified program channel is selected by a user via a user interface included in the receiver, and wherein after a transition from the OFF state to the ON state, until a channel is selected by the user, the specified program channel is the most recently selected channel.

30. The method of claim 21, wherein the receiving includes receiving receiver commands transmitted by the broadcaster and associated with at least some of the received content, the method further comprising:
accepting user commands on a user interface included in the receiver, the user commands to carry out a plurality of functions, including at least one of a skip function and a fast forward function,
storing skip content information, the skip content information being:
derived at least in part from the receiver commands and associated with at least one of the received program content segments; and
configured to cause the receiver controller to inhibit one or more of the plurality of functions of the user commands when at least one program segment associated with the skip content information and stored in the memory is included in the output signal.

31. The method of claim 30, wherein the one or more of the plurality of functions that may be inhibited by the skip content information apply to program segments that are commercials.

32. A transmitting apparatus comprising:
a modulator; and
a transmitter controller; and
a transmitter
wherein:
the transmitter controller causes the modulator to produce program segments representative of portions of one or more program channels including error correction and detection information coded according to an error-correcting and detecting code, and causes the transmitter to transmit the produced program segments and the error correction and detection information of the program segments on one or more program channels for reception by one or more receivers and to transmit receiver commands related to the transmitted produced program segments, the receiver commands including at least one of
commands indicative of whether a transmitted program segment is for real-time output, and
commands indicative that a transmitted program segment is not to be skipped,
such that a particular receiver receiving content transmitted by the transmitter corresponding to at least one channel and receiving the transmitted receiver commands:
checks the received content to generate dropout-free content segments, the checking including checking the error correction and detection information such that the dropout-free content segments have passed the checking of the dropout-free content segments' error correction and detection information;
stores dropout-free content segments in a receiver-included memory, the dropout-free content segments having associated program channel information, wherein program content segments to be stored in said memory are checked to make sure they are dropout-free before being stored;
stores channel information indicative of the respective program channel of the program channel(s) associated with each segment of the stored dropout-free content segments in the particular receiver's receiver-included memory;
checks if the received receiver commands include commands indicative that the received content is not to be skipped, in which case the particular receiver can store skip content information derived at least in part from the received receiver commands, associated with at least one of the received program segments, and configured to cause the particular receiver to inhibit one or more of the plurality of functions of a user interface when at least one program segment associated with the skip content information and stored in the memory is output by the particular receiver; and
performs a program channel content check which depends at least in part on the received receiver commands for a specified program channel of the at least one program channel to which at least some of the received content corresponds, said program channel content check producing an acceptable result or an unacceptable result, such that if the program channel content checking produces the acceptable result, the particular receiver can output at least a portion of the program content stored in the memory which is associated with the specified program channel in preference to other program segments associated with the specified program channel, and if the program channel content check produces the unacceptable result, including the result that there is no usable, stored, dropout-free content available for the specified program channel, or the result that said other program segments on said specified program channel require real-time output, the particular receiver can output at least one of the other program segments associated with the specified program channel.

\* \* \* \* \*